US010519923B2

(12) United States Patent
Momen et al.

(10) Patent No.: US 10,519,923 B2
(45) Date of Patent: Dec. 31, 2019

(54) NEAR ISOTHERMAL COMBINED COMPRESSED GAS/PUMPED-HYDRO ELECTRICITY STORAGE WITH WASTE HEAT RECOVERY CAPABILITIES

(71) Applicant: UT-Battelle, LLC, Oak Ridge, TN (US)

(72) Inventors: Ayyoub Mehdizadeh Momen, Knoxville, TN (US); Kyle J. Gluesenkamp, Knoxville, TN (US); Omar A. Abdelaziz, Knoxville, TN (US); Edward A. Vineyard, Knoxville, TN (US); Ahmed Abu-Heiba, Alexandria (EG); Adewale O. Odukomaiya, Powder Springs, GA (US)

(73) Assignee: UT-Battelle, LLC, Oak Ridge, TN (US)

( * ) Notice: Subject to any disclaimer, the term of this patent is extended or adjusted under 35 U.S.C. 154(b) by 322 days.

(21) Appl. No.: 15/254,137

(22) Filed: Sep. 1, 2016

(65) Prior Publication Data
US 2017/0082123 A1     Mar. 23, 2017

Related U.S. Application Data

(60) Provisional application No. 62/221,322, filed on Sep. 21, 2015.

(51) Int. Cl.
*F04B 41/02* (2006.01)
*F03D 9/14* (2016.01)
(Continued)

(52) U.S. Cl.
CPC .............. *F03B 1/02* (2013.01); *F01K 7/00* (2013.01); *F03B 13/06* (2013.01); *F03D 9/14* (2016.05);
(Continued)

(58) Field of Classification Search
CPC ......... Y02E 60/15; Y02E 60/17; Y02E 10/22; Y02E 70/30; F15B 1/10; F15B 1/265; F03B 1/02; F03B 13/06; F03D 9/14; F01K 7/00; H02J 5/006; F05B 2220/706; F02C 6/16
USPC ........................................ 60/398; 138/30, 31
See application file for complete search history.

(56) References Cited

U.S. PATENT DOCUMENTS 6,033,192 A *  3/2000  Wood ........................ E21F 3/00
                                                       137/630.14
7,003,955 B2 *  2/2006  Davis ........................ E02B 9/00
                                                       60/641.11

(Continued)

*Primary Examiner* — Thomas E Lazo
*Assistant Examiner* — Dustin T Nguyen
(74) *Attorney, Agent, or Firm* — Warner Norcross + Judd LLP

(57) ABSTRACT

Systems store energy mechanically at a first time and extract the energy at a later time. When excess electricity from renewable sources or during off-peak periods is available, a pump directs a working liquid (L) to pressurize a gas (G) that is confined within a pressure vessel. When electricity from renewable sources is not available or during periods of peak demand or pricing, the pressurized gas (G) directs the working liquid (L) through a hydropower turbine. The turbine drives a generator through a mechanical coupling to provide electricity for powering a load. In addition, the system can leverage (take) any waste heat as the input to boost the efficiency of the system. The described systems function at ground level and are modular and scalable in capacity.

18 Claims, 29 Drawing Sheets

Closed System-Pulsed Charging transient temperature and pressure profiles.

(51) Int. Cl.
  *F03B 1/02* (2006.01)
  *F01K 7/00* (2006.01)
  *F03B 13/06* (2006.01)
  *H02J 15/00* (2006.01)

(52) U.S. Cl.
  CPC ........ *F04B 41/02* (2013.01); *F05B 2220/706* (2013.01); *H02J 15/006* (2013.01); *Y02E 10/22* (2013.01); *Y02E 10/725* (2013.01); *Y02E 60/15* (2013.01); *Y02E 60/17* (2013.01); *Y02E 70/30* (2013.01)

(56) References Cited

U.S. PATENT DOCUMENTS

| | | | | |
|---|---|---|---|---|
| 8,240,509 B2* | 8/2012 | Geiger | | B65D 83/625 222/105 |
| 2010/0205960 A1* | 8/2010 | McBride | | F02C 6/16 60/641.2 |
| 2011/0030361 A1* | 2/2011 | Gopalswamy | | F03D 5/06 60/398 |
| 2011/0115223 A1* | 5/2011 | Stahlkopf | | F01K 13/02 290/7 |
| 2011/0259001 A1* | 10/2011 | McBride | | F22B 1/14 60/517 |
| 2011/0283690 A1* | 11/2011 | Bollinger | | F02C 6/16 60/327 |
| 2012/0297772 A1* | 11/2012 | McBride | | F01B 23/00 60/649 |
| 2014/0013735 A1* | 1/2014 | McBride | | E21D 11/00 60/398 |
| 2015/0345802 A1* | 12/2015 | Van Haaren | | F24D 3/1008 220/721 |
| 2015/0362124 A1* | 12/2015 | Favy | | F02C 6/16 206/0.6 |
| 2016/0348637 A1* | 12/2016 | Bachli | | F03B 13/00 |

* cited by examiner

Closed System-Base transient temperature and pressure profiles.

Closed System-Base base p-v diagram.

Closed System-Base component losses.

Closed System-Pulsed Charging transient temperature and pressure profiles.

Closed System-Pulsed charging p-v diagram.

Closed System-Pulse Charging component losses.

Closed System-Recirculation transient temperature and pressure profiles.

Closed System-Recirculation component losses.

Closed System-Recirculation transient temperature and pressure profiles.

Closed System-Recirculation and H/E p-v diagram.

|  | Base configuration (configuration 1) | Configuration 2* | Configuration 3* | | |
| --- | --- | --- | --- | --- | --- |
|  |  |  | $T_{WH} = 50°C$ | $T_{WH} = 70°C$ | $T_{WH} = 90°C$ |
| $\eta_{elec}$ [-] | 0.66 | 0.70 | 0.75 | 0.78 | 0.82 |
| $\eta_{ind}$ [-] | 0.90 | 0.96 | 1.03 | 1.07 | 1.12 |
| $\eta_{ex}\dot{V}$ | 0.66 | 0.70 | 0.66 | 0.59 | 0.52 |
| ED [MJ/m³] | 2.46 | 3.08 | 3.28 | 3.43 | 3.59 |

*With $\dot{V}_{spr} = 12$ L/min.

FIG. 20

STORAGE CYCLE - STEP 2
OPEN SYSTEM

EXTRACTION CYCLE - STEP 1
OPEN SYSTEM

| Mixture | | Mixture | | Mixture | |
|---|---|---|---|---|---|
| Gas_1 | Gas_2 | Gas_1 | Gas_2 | Gas_1 | Gas_2 |
| 'R125' | 'R143a' | 'Oxygen' | 'H2s' | 'H2s' | 'Nitrogen' |
| 'R125' | 'R32' | 'Oxygen' | 'Isopentane' | 'n-Hexane' | 'Water' |
| 'R125' | 'R134' | 'Propane' | 'Argone' | 'n-Hexane' | 'Oxygen' |
| 'R143a' | 'R134a' | 'Propane' | 'Helium' | 'n-Hexane' | 'H2s' |
| 'R152a' | 'R134a' | 'Propane' | 'IsoButane' | 'n-Hexane' | 'Isopentane' |
| 'R32' | 'R134a' | 'Propane' | 'Nitrogen' | 'n-Hexane' | 'n-Decane' |

| | | | | | |
|---|---|---|---|---|---|
| 'Argon' | 'Helium' | 'Propane' | 'Water' | 'n-Nonane' | 'CO2' |
| 'Argon' | 'IsoButane' | 'Propane' | 'Oxygen' | 'n-Nonane' | 'Hydrogen' |
| 'Argon' | 'H2s' | 'Propane' | 'H2s' | 'n-Nonane' | 'n-Heptane' |
| 'Argon' | 'Isopentane' | 'Propane' | 'Isopentane' | 'n-Nonane' | 'CO' |
| 'CO2' | 'Hydrogen' | 'Water' | 'H2s' | 'n-Nonane' | 'Methane' |
| 'CO2' | 'n-Heptane' | 'Water' | 'Isopentane' | 'n-Nonane' | 'Ethane' |
| 'CO2' | 'Methane' | 'n-Butane' | 'n-Pentane' | 'n-Nonane' | 'Propane' |
| 'CO2' | 'Ethane' | 'n-Butane' | 'n-Hexane' | 'n-Nonane' | 'Argon' |
| 'CO2' | 'Propane' | 'n-Butane' | 'n-Octane' | 'n-Nonane' | 'Helium' |
| 'CO2' | 'Helium' | 'n-Butane' | 'n-Nonane' | 'n-Nonane' | 'IsoButane' |
| 'CO2' | 'IsoButane' | 'n-Butane' | 'n-Decane' | 'n-Nonane' | 'Nitrogen' |
| 'CO2' | 'H2s' | 'n-Butane' | 'CO2' | 'n-Nonane' | 'Water' |
| 'CO2' | 'Isopentane' | 'n-Butane' | 'Hydrogen' | 'n-Nonane' | 'Oxygen' |
| 'CO' | 'Methane' | 'n-Butane' | 'n-Heptane' | 'n-Nonane' | 'H2s' |
| 'CO' | 'Ethane' | 'n-Butane' | 'CO' | 'n-Nonane' | 'Isopentane' |
| 'CO' | 'Propane' | 'Propane' | 'Methane' | 'n-Octane' | 'n-Nonane' |
| 'CO' | 'Helium' | 'n-Butane' | 'Ethane' | 'n-Octane' | 'n-Decane' |
| 'CO' | 'IsoButane' | 'n-Butane' | 'Propane' | 'n-Octane' | 'CO2' |
| 'CO' | 'H2s' | 'n-Butane' | 'Argon' | 'n-Octane' | 'Hydrogen' |
| 'CO' | 'Isopentane' | 'n-Butane' | 'Helium' | 'n-Octane' | 'n-Heptane' |
| 'Ethane' | 'Propane' | 'n-Butane' | 'IsoButane' | 'n-Octane' | 'CO' |
| 'Ethane' | 'Argon' | 'n-Butane' | 'Nitrogen' | 'n-Octane' | 'Methane' |
| 'Ethane' | 'Helium' | 'n-Butane' | 'Water' | 'n-Octane' | 'Ethane' |
| 'Ethane' | 'IsoButane' | 'n-Butane' | 'Oxygen' | 'n-Octane' | 'Propane' |
| 'Ethane' | 'Nitrogen' | 'n-Butane' | 'H2s' | 'n-Octane' | 'Argon' |
| 'Ethane' | 'Water' | 'n-Butane' | 'Isopentane' | 'n-Octane' | 'Hellium' |

FIG. 27A

| 'Ethane' | 'Oxygen' | 'n-Decane' | 'CO2' | 'n-Octane' | 'IsoButane' |
|---|---|---|---|---|---|
| 'Ethane' | 'H2s' | 'n-Decane' | 'Hydrogen' | 'n-Octane' | 'Nitrogen' |
| 'Ethane' | 'Isopenane' | 'n-Decane' | 'n-Heptane' | 'n-Octane' | 'Water' |
| 'Helium' | 'IsoButane' | 'n-Decane' | 'CO' | 'n-Octane' | 'Oxygen' |
| 'Helium' | 'Nitrogen' | 'n-Decane' | 'Methane' | 'n-Octane' | 'H2s' |
| 'Helium' | 'Water' | 'n-Decane' | 'Ethane' | 'n-Octane' | 'Isopentane' |
| 'Helium' | 'Oxygen' | 'n-Decane' | 'Propane' | 'n-Pentane' | 'n-Hexane' |
| 'Helium' | 'H2s' | 'n-Decane' | 'Argon' | 'n-Pentane' | 'n-Octane' |
| 'Hydrogen' | 'Isopenane' | 'n-Decane' | 'Helium' | 'n-Pentane' | 'n-Nonane' |
| 'Hydrogen' | 'n-Heptane' | 'n-Decane' | 'IsoButane' | 'n-Pentane' | 'n-Decane' |
| 'Hydrogen' | 'CO' | 'n-Decane' | 'Nitrogen' | 'n-Pentane' | 'CO2' |
| 'Hydrogen' | 'Methane' | 'n-Decane' | 'Water' | 'n-Pentane' | 'Hydrogen' |
| 'Hydrogen' | 'Ethane' | 'n-Decane' | 'Oxygen' | 'n-Pentane' | 'n-Heptane' |
| 'Hydrogen' | 'Propane' | 'n-Decane' | 'H2s' | 'n-Pentane' | 'CO' |
| 'Hydrogen' | 'Argon' | 'n-Decane' | 'Isopentane' | 'n-Pentane' | 'Methane' |

| 'Hydrogen' | 'Helium' | 'n-Heptane' | 'CO' | 'n-Pentane' | 'Ethane' |
|---|---|---|---|---|---|
| 'Hydrogen' | 'Isopenane' | 'n-Heptane' | 'Methane' | 'n-Pentane' | 'Propane' |
| 'Hydrogen' | 'Nitrogen' | 'n-Heptane' | 'Ethane' | 'n-Pentane' | 'Argon' |
| 'Hydrogen' | 'Water' | 'n-Heptane' | 'Propane' | 'n-Pentane' | 'Helium' |
| 'Hydrogen' | 'Oxygen' | 'n-Heptane' | 'Argon' | 'n-Pentane' | 'IsoButane' |
| 'Hydrogen' | 'H2s' | 'n-Heptane' | 'Helium' | 'n-Pentane' | 'Nitrogen' |
| 'Hydrogen' | 'Isopentane' | 'n-Heptane' | 'IsoButane' | 'n-Pentane' | 'Water' |
| 'H2s' | 'Isopentane' | 'n-Heptane' | 'Nitrogen' | 'n-Pentane' | 'Oxygen' |
| 'IsoButane' | 'Nitrogen' | 'n-Heptane' | 'Water' | 'n-Pentane' | 'H2s' |
| 'IsoButane' | 'Water' | 'n-Heptane' | 'Oxygen' | 'n-Pentane' | 'Isopentane' |
| 'IsoButane' | 'Oxygen' | 'n-Heptane' | 'H2s' | 'Argon' | 'Nitrogen' |
| 'IsoButane' | 'H2s' | 'n-Heptane' | 'Isopentane' | 'Argon' | 'Water' |
| 'IsoButane' | 'Isopentane' | 'n-Hexane' | 'n-Octane' | 'Argon' | 'Oxygen' |
| 'Methane' | 'Ethane' | 'n-Heptane' | 'n-Nonane' | 'CO2' | 'CO' |
| 'Methane' | 'Propane' | 'n-Heptane' | 'n-Decane' | 'CO2' | 'Argon' |
| 'Methane' | 'Argon' | 'n-Heptane' | 'CO2' | 'CO2' | 'Nitrogen' |
| 'Methane' | 'Helium' | 'n-Heptane' | 'Hydrogen' | 'CO2' | 'Water' |
| 'Methane' | 'IsoButane' | 'n-Heptane' | 'n-Heptane' | 'CO2' | 'Oxygen' |
| 'Methane' | 'Nitrogen' | 'n-Heptane' | 'CO' | 'CO' | 'Argon' |
| 'Methane' | 'Water' | 'n-Heptane' | 'Methane' | 'CO' | 'Nitrogen' |

FIG. 27B

| 'Methane' | 'Oxygen' | 'n-Hexane' | 'Ethane' | 'CO' | 'Water' |
|---|---|---|---|---|---|
| 'Methane' | 'H2s' | 'n-Hexane' | 'Propane' | 'CO' | 'Oxygen' |
| 'Methane' | 'Isopentane' | 'n-Hexane' | 'Argon' | 'Nitrogen' | 'Water' |
| 'Nitrogen' | 'H2s' | 'n-Hexane' | 'Helium' | 'Nitrogen' | 'Oxygen' |
| 'Nitrogen' | 'Isopentane' | 'n-Hexane' | 'IsoButane' | 'Water' | 'Oxygen' |
| 'Ethanol' | 'Water' | 'R245fa' | 'R134a' | 'R1234ze(E)' | 'R32' |
| 'R32' | 'R1234yf' | | | | |

FIG. 27C

| Mixture | Saturation Pressure, bar (Density Ratio*) | | |
|---|---|---|---|
| | 20 | 30 | 40 |
| 65% Propane, 35% Nitrogen | 135.0 (18.2) | 129.1 (13.1) | 130.8 (9.5) |
| 7% n-Pentane, 93% Carbon Dioxide | 50.5 (44.7) | 62.0 (27.1) | 133.8 (20.0) |
| 98% Carbon Dioxide, 2% n-Heptane | 55.0 (175.0) | 68.2 (94.9) | 82.6 (48.5) |
| 40% Carbon Dioxide, 60% Propane | 32.5 (18.2) | 38.9 (13.1) | 45.8 (9.3) |
| 82% Carbon Dioxide, 18% IsoButane | 45.4 (17.8) | 55.5 (12.2) | 66.2 (7.6) |
| 80% Carbon Dioxide, 20% Isopentane | 41.7 (88.6) | 50.5 (59.3) | 60.0 (40.0) |
| 95% Carbon Dioxide, 5% Isopentane | 52.3 (21.0) | 87.9 (12.9) | 94.0 (7.0) |
| 60% IsoButane, 40% Nitrogen | 202.8 (49.9) | 172.9 (35.8) | 147.9 (25.8) |
| 21% n-Butane, 79% Carbon Dioxide | 43.8 (30.6) | 53.1 (20.3) | 63.2 (13.2) |
| 74% n-Pentane, 26% Nitrogen | 201.4 (319.7) | 194.0 (221.9) | 187.1 (157.8) |

*Density ratio = Density of liquid phase/Density of gaseous phase

FIG. 28

NEAR ISOTHERMAL COMBINED COMPRESSED GAS/PUMPED-HYDRO ELECTRICITY STORAGE WITH WASTE HEAT RECOVERY CAPABILITIES

CROSS-REFERENCE TO RELATED APPLICATIONS

This patent application claims priority to U.S. provisional patent application Ser. No. 62/221,322, filed 21 Sep. 2015, and entitled, "High-Efficiency Ground-Level Pumped-Hydro Electricity Storage", which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

THE NAMES OF THE PARTIES TO A JOINT RESEARCH AGREEMENT

None.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

None.

STATEMENT REGARDING PRIOR DISCLOSURES BY THE INVENTOR OR A JOINT INVENTOR

None.

BACKGROUND OF THE INVENTION

1. Field of the Invention

The present disclosure relates to energy storage systems and more particularly to the mechanical and heat storage of energy at an earlier time for use at a later time.

2. Description of the Related Art

Electricity generating devices such as wind turbines, photovoltaic panels and hydroelectric power systems generate electricity without burning fossil fuels. These generators use renewable sources such as wind, sun and falling water to power the generators. In order to react to potential interruptions in renewable sources and to react to changing grid load demands, electricity storage is necessary.

Presently, batteries are the storage choice in residential and commercial buildings. Low cost batteries typically have round trip efficiencies (RTE) between 70 to 85% and cost 200-600 $/kWh (Li-ion batteries are 85-95% efficient and cost 600-1200 $/kWh.) Unfortunately, batteries have a number of drawbacks. Unless they are charged from a DC source, a AC-DC converter results in additional cost and efficiency losses. Repeated cycling degrades the storage capacity of batteries and battery life is also shortened when batteries are allowed to fully-discharge. Large scale deployment is also limited in high rise buildings due to fire risks.

Pumped storage hydroelectricity (PSH) stores water in an elevated reservoir when electricity demand is low and releases the water under the force of gravity to generate electricity when electricity demand is high. PSH is a mature technology with relatively high RTE of between 75-80%. However, PSH has poor expansion prospects in the US because site selection and approval is often difficult, and most favorable sites are already exploited.

Where PSH is not an option, compressed air energy storage (CAES) is often used.

However, because of large compressor losses, CAES has low RTE of about 40-55% for conventional diabatic CAES. With advanced CAES technologies such as adiabatic CAES and isothermal CAES, RTEs up to and above 70% are achievable.

Rail energy storage uses heavily-loaded rail cars and electric motors/generators to store energy on long, low-angle earthen inclines. When energy is abundant, the rail cars ascend the incline using an electric motor powered by a renewable source or the grid. When energy demand is high, the rail cars descend the incline and the motor functions in reverse as a generator to produce electricity. Very long slopes with 6-8% grade are needed, which limits the geographical areas where rail energy storage systems can be built.

Increasing the penetration of renewable electricity generation requires low cost, highly round trip-efficient energy storage systems to smooth intermittent power production and store the power for use when demand is high. There is a great need for high-efficiency, highly scalable, cost-effective storage systems that are environmentally benign, flexible in operation, and that do not require large physical footprints.

BRIEF DESCRIPTION OF THE SEVERAL VIEWS OF THE DRAWING(S)

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 20 is a table comparing efficiencies of a base closed configuration with closed configuration 2 (recirculation) and closed configuration 3 (recirculation with a heat exchanger at three different waste heat temperatures).

FIGS. 27A-27C show a table illustrating pairs of binary gas mixtures.

FIG. 28 is a table illustrating preferred pairs of binary gas mixtures.

DETAILED DESCRIPTION OF THE INVENTION

This disclosure describes and fully enables a Near Isothermal Combined Compressed Gas/Pumped-Hydro Electricity Storage with Waste Heat Recovery Capabilities also referred to as Ground-Level Integrated Diverse Energy Storage (GLIDES).

Thermodynamic Model.

Figure 1:
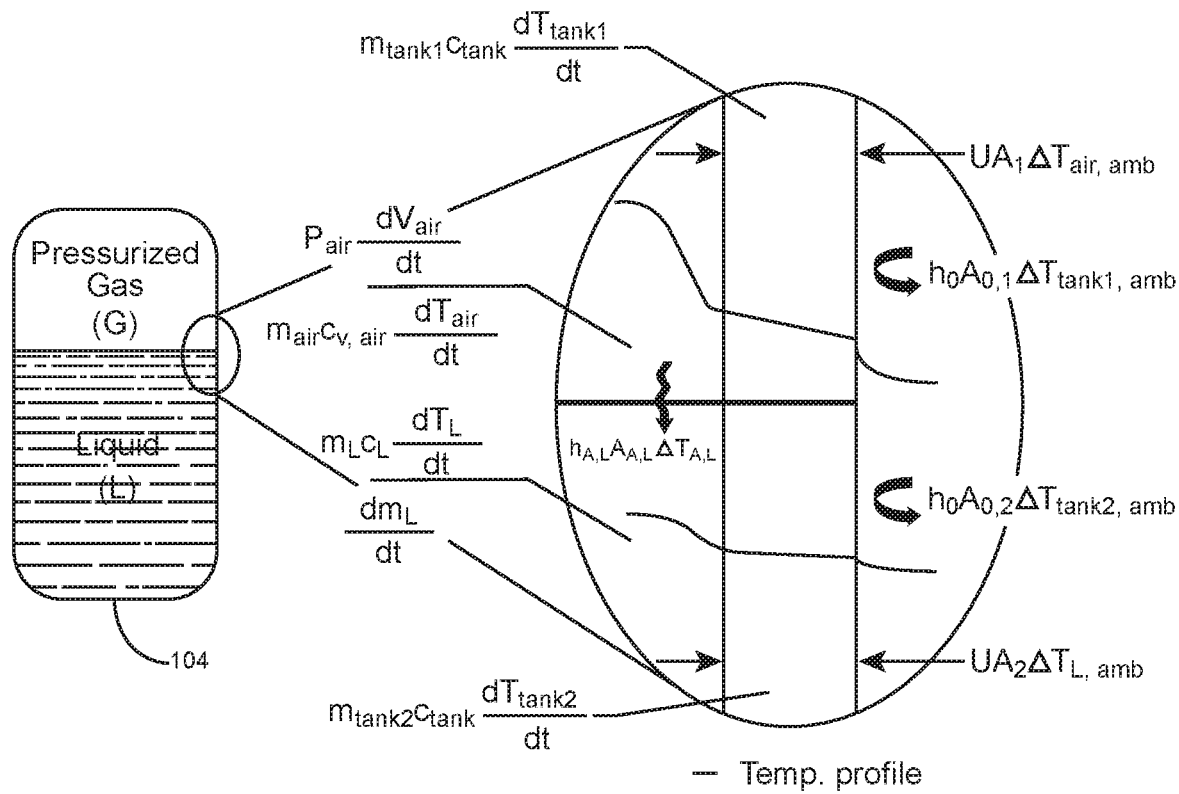
FIG. 1 is a schematic illustration of a thermodynamic model of the exemplary systems.

With reference to FIG. 1, the governing thermodynamic equations for the disclosed systems are now introduced. A detailed control-volume (CV) energy analysis of the three major thermal masses (gas (e.g., air), liquid (e.g., water), tank walls) was conducted, yielding the set of coupled differential equations labelled as equations 1-6 below. Each CV and medium considered in modeling can be seen in FIG. 1. Each medium is modeled as its own CV, the tank walls are modeled as two separate CVs, one being the portion of the tank walls in contact with the gas (tank1), the other being the portion of the tank walls (tank2) in contact with the working liquid (e.g., water, hydraulic fluid, polyester oil, lubricating oil or other liquid).

Several assumptions are made in the use of these equations: no spatial temperature gradients within each medium (lumped capacitance); ambient temperature is constant in time; constant thermophysical properties for tank wall material; gas inside tank is modeled as a Redlich-Kwong substance using Redlich-Kwong equation of state for better prediction than ideal gas at high pressures; negligible heat transfer between masses of tank1 and tank2; quasi-steady processes.

Energy equation for the compressed gas (e.g., air) in the tank:

$$m_{air}c_{v,air}\frac{dT_{air}}{dt} = -h_{A,L}A_{A,L}(T_{air}-T_L) - UA_1(T_{air}-T_{amb}) - p_{air}\frac{dV_{air}}{dt} \quad (1)$$

Energy equation for the working liquid (e.g., water):

$$m_L c_L \frac{dT_L}{dt} = h_{A,L}A_{A,L}(T_{air}-T_L) - UA_2(T_L-T_{amb}) + \dot{m}_L c_L(T_L-T_{amb}) \quad (2)$$

Energy equation for the tank walls in contact with the gas (e.g., air):

$$m_{tank,1}c_{tank}\frac{dT_{tank,1}}{dt} = h_{i,1}A_{i,1}(T_{air}-T_{tank,1}) - h_o A_{o,1}(T_{tank,1}-T_{amb}) \quad (3)$$

Energy equation for the tank walls in contact with the working liquid:

$$m_{tank,2}c_{tank}\frac{dT_{tank,2}}{dt} = h_{i,2}A_{i,2}(T_L-T_{tank,2}) - h_o A_{o,2}(T_{tank,2}-T_{amb}) \quad (4)$$

Continuity equation for the gas:

$$\frac{dV_{air}}{dt} = \frac{\dot{m}_L}{\rho_L} \quad (5)$$

Continuity equation for the working liquid:

$$\frac{dm_L}{dt} = \dot{m}_L \quad (6)$$

The above equations are discretized using a finite-difference scheme and used to solve the transient response of each of the three mediums. The overall heat transfer coefficients UA1 and UA2 are calculated using an effective thermal resistance network comprising of convection on the inside, conduction through the tank walls, and convection on the outside; equations 7 and 8 are used to calculate UA1 and UA2.

$$UA_1 = \frac{1}{\left(\frac{1}{h_{i,1}A_{i,1}}\right)+\left(\frac{th}{k_{tank}A_{ave,1}}\right)+\left(\frac{1}{h_o A_{o,1}}\right)} \quad (7)$$

$$UA_2 = \frac{1}{\left(\frac{1}{h_{i,2}A_{i,2}}\right)+\left(\frac{th}{k_{tank}A_{ave,2}}\right)+\left(\frac{1}{h_o A_{o,2}}\right)} \quad (8)$$

The gas-to-liquid heat transfer coefficient (hA,L) is calculated using correlations by Loyd & Moran (1974), assuming natural convection over a horizontal flat plate. The inner heat transfer coefficients (hi,1 and hi,2) are calculated using LeFevre's (1956) correlation, approximating the inside surface of the tall/slender cylindrical tanks as a vertical wall. The outer heat transfer coefficient (ho) is modeled assuming forced convection over a vertical cylinder at average outdoor wind velocity for the month of March 2015 in Knoxville, Tenn. (~3 m/s), using a Churchill and Bernstein (1977) correlation.

While the charging flow rate of liquid is kept constant by the positive-displacement pump, the discharge mass flow rate is not constant, and decreases as the gas inside the tanks expands and the pressure decreases. A flow model was created to account for this varying mass flow rate as well as frictional piping losses over the piping network leading from the tank discharge to the hydropower turbine (e.g., Pelton turbine, triplex plunger expander/pump). When only one turbine jet is used, the discharge liquid flow rate varies approximately from a max of 15.5 L/min to a min of 11.4 L/min. In some examples, the max flow rate is greater than 15.5 L/min and in other examples, the max flow rate is less than 11.4 L/min. Other physical complexities that have been captured in this model include time-varying heat transfer areas, mass of liquid, mass of tank1, and mass of tank2; temperature and pressure-dependent thermos physical properties of gas; and temperature dependent thermos physical properties of liquid. The mass of liquid increases during charging and decreases during discharging. The mass of tank in contact with compressed gas (tank1) decreases during charging, and increases during discharging, while the mass of tank (tank2) in contact with working liquid increases during charging and decreases during discharging.

Closed Systems.

Figure 2:
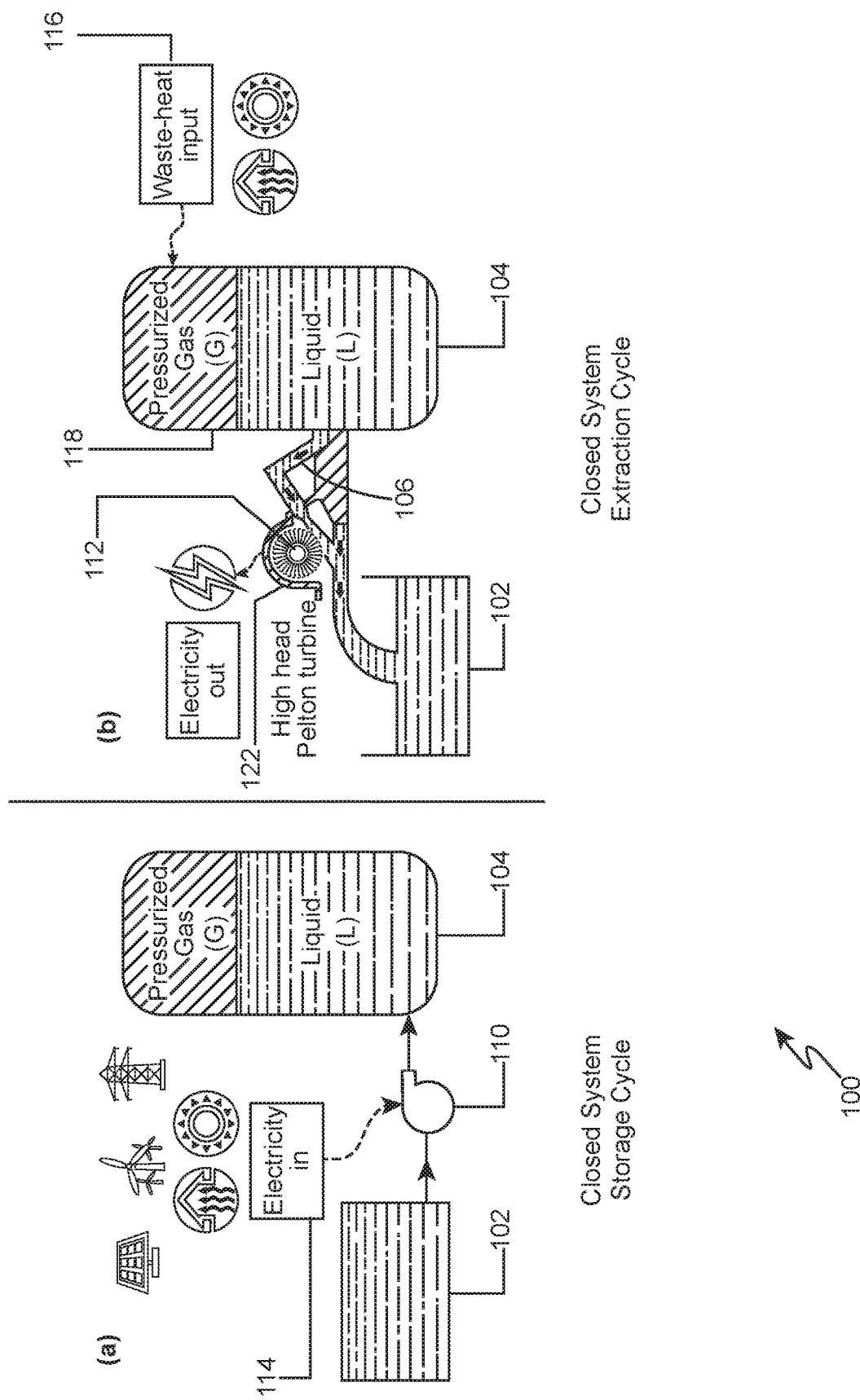
FIG. 2 is a schematic illustration of a base closed system operating in an energy storage cycle and an energy extraction cycle.

Referring now to FIG. 2, an exemplary ground-level energy storage and extraction system 100 will now be described. The term "ground-level" means that each of the elements of the system 100 are installed at approximately the same height above sea level. A reservoir 102 stores a working liquid (L) such as water, hydraulic fluid, or some other liquid for example. A pressure vessel 104 stores a volume of a condensable or non-condensable gas (G) (e.g., air) and a volume of the working liquid (L). The pressure vessel 104 is fluidly coupled to the reservoir 102, meaning that the working liquid (L) or gas (G) can flow from one to another via an enclosed conduit such as pipes 106 and valves 108. In some larger-scale systems 100, two or more pressure vessels 104 are fluidly coupled together for increased energy storage capacity. High-pressure gas tanks (10-10000 liters) were chosen as the pressure vessel 104 and are commercially available for pressures higher than 50-300 bar (3 km of liquid head).

A pump 110 is fluidly coupled between the reservoir 102 and the pressure vessel 104 and is used to transfer the working liquid (L) from the reservoir 102 to the pressure vessel 104. A positive displacement pump 110 was chosen and is designed for low-flow, high-head applications (e.g. 200-300 bar) where its mechanical efficiency does not vary significantly over a wide range of pressure heads or flow rates. High-efficiency positive displacement pumps 110 are commercially available in a wide range of sizes (e.g. 1 to 500 kW).

A hydropower turbine 112 is fluidly coupled between the pressure vessel 104 and the reservoir 102 and is powered by pressurized working liquid (L) exiting the pressure vessel 104 during the energy extraction cycle. The working liquid (L) discharges back into the atmospheric reservoir 102 (or lake, pond, sea or other surface water) after impacting the rotor buckets or blades of the turbine 112. A Pelton turbine 112 was chosen for these systems 100 since it is a low-cost hydraulic impulse turbomachine that is suitable for low-flow, high-head applications (greater than 80 m liquid head). Pelton turbines 112 can be designed for a capacity ranging from 2 kW to 280 MW. One beneficial feature of Pelton turbines 112 is that their peak efficiency is fairly insensitive to flow rate. A typical Pelton turbine 112 can have 1 to 5 or more impinging jets, and by turning each individual impinging jet on or off, the flow rate and the output power can be adjusted without greatly affecting the turbine efficiency. The mechanical efficiency of Pelton turbines 112 has been shown to exceed 93%. Other types of hydraulic turbines can be used here. This includes positive displacement turbines, piston turbines, reversible pump/turbine system and etc.

The pump 110 is powered by electricity provided by a power source 114 such as the grid or renewable solar as shown in the example. Other sources 114, such as wind, hydro may also be used exclusively or in combination. If conversion from DC current to AC current is necessary to power the pump 110, then an inverter may be used. A phase change material (PCM) 116 may be used to absorb heat energy from the sun or other low grade heat resources during charging and release the heat energy to the pressurized gas (G) during the discharge. Materials such as paraffin wax, salt, or other PCMs 116 known in the art may be used.

During a time when renewable energy sources are available, or excess electricity is generally available, the system 100 operates in an energy storage cycle as shown on the left-hand side of FIG. 2. The pump 110 transfers the working liquid (L) from the reservoir 102 to the pressure vessel 104, which contains the pressurized gas (G). In some examples, an insulation layer 118 such as foam, porous silica or aerogel may separate the working liquid (L) from the pressurized gas (G). In other examples, the pressurized gas (G) is contained within an expandable bladder 120 made of rubber or other pliant material. The cycle begins when there is a small amount of liquid (e.g. 10 kg of working liquid (L)) in the tanks and the initial pressure is low (e.g. 78 bar). The gas (G), initially at 78 bar and ambient temperature is compressed as working liquid (L) is pumped into the pressure vessels 104 at specific or variable flow rate (e.g. 35 L/min) from the bottom (or top or side) of the reservoir 102. In this specific example, the gas (G) warms to a temperature of up to about 62° C. and pressure of up to about 130 bar, at which point the process is paused for a period of time, allowing the gas (G) temperature to cool back down to ambient. During this post-compression pause, the gas (G) pressure drops down above or to about 117 bar as the gas (G) cools. In other examples, the gas (G) warms to a temperature above about 62° C. and pressure of above about 130 bar, at which point the process is paused for a period of time, allowing the gas (G) temperature to cool back down to ambient. During this post-compression pause, the gas (G) pressure drops down below about 117 bar as the gas (G) cools. These examples are in no way limiting, and other conditions may occur with different systems 1100.

During a time when renewable energy sources are no longer available, or during peak energy demand or pricing periods, the system 100 operates in an energy extraction cycle as shown on the right-hand side of FIG. 2. After the pause, the pressurized gas (G) is now at ambient temperature, above, below or at 117 bar pressure is allowed to expand as it pushes the working liquid (L) contained in the pressure vessels 104 out, through the turbine 112. The turbine 112 is mechanically coupled to an electric generator 122 via a shaft, gears, pulleys, belt, chain or other drive train known in the art.

Figure 3:
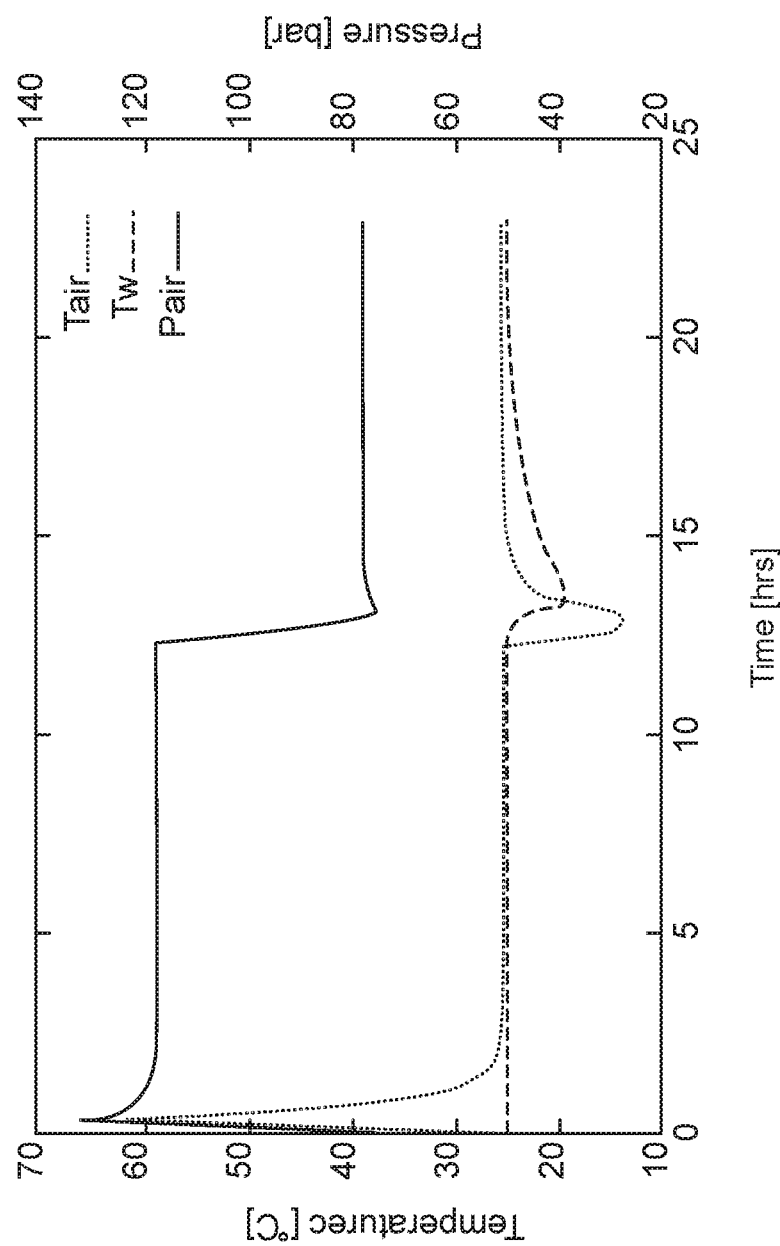
FIG. 3 is a graph illustrating the transient temperature and pressure profiles of a base closed system using continuous charging.

FIG. 3 shows transient temperature and pressure profiles for the pressurized gas (G) and working liquid (L) temperature during the energy storage and energy extraction cycles.

The pressurized gas (G) temperature profile during expansion shows some interesting characteristics. The pressurized gas (G) temperature initially drops as the pressurized gas (G) expands, but this rate of temperature decrease due to expansion is later overcome by heat transfer effects, as heat is transferred from the now warmer ambient to the pressurized gas (G); the temperature gradient changes sign before expansion stops. The pressurized gas (G) heat transfer surface area is also increasing during the expansion process; this further magnifies the aforementioned heat transfer effects in the later stages of the expansion process. Finally, the cycle is paused after the expansion process is complete, heat transfer to the pressurized gas (G) from the ambient continues to occur until the gas (G) temperature comes back into equilibrium with the ambient, and the pressurized gas (G) pressure returns to its initial level of pressurization, completing the four process cycle. Due to its high thermal capacitance, the temperature of the working liquid (L) does not deviate much from ambient. There is a small deviation (~5° C.) from ambient near the end of the expansion from ambient near the end of the expansion process, when the amount of working liquid (L) left in the pressure vessels 104 is small.

Figure 4:
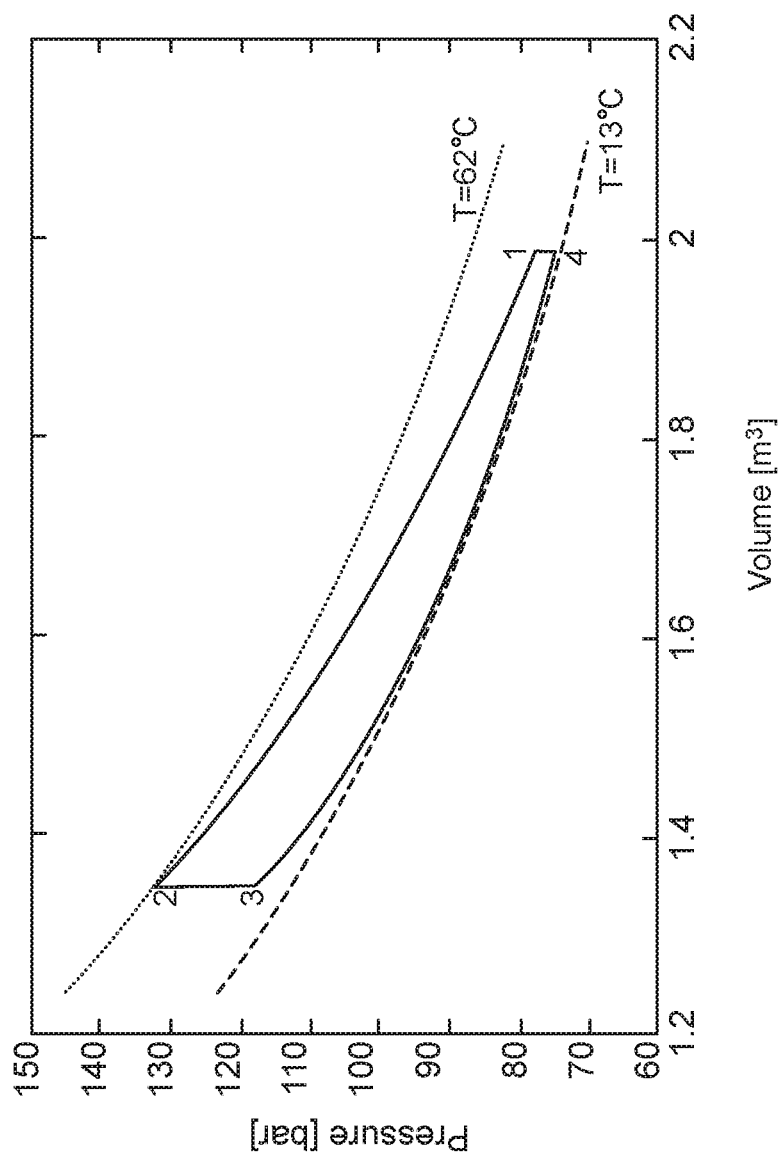
FIG. 4 is a p-v diagram of a base closed system using continuous charging.

FIG. 4 shows a p-v diagram of the pressurized gas (G) for the storage and extraction cycles. The area under the curve from state 1 to state 2 represents work input or charging (gas (G) compression and storage); from state 2 to state 3 represents a pause (heat-loss to ambient); the area under the curve from state 3 to state 4 is a work output (gas (G) extraction/power stroke); and from state 4 to state 1 represents a pause (heat-gain from ambient). The difference between the area under curve from state 1 to state 2 and the area under the curve from state 3 to state 4 is work lost due to expansion and compression of the pressurized gas (G). The indicated cycle efficiency (ratio of hydraulic work out to hydraulic work in) is 91% even in this base-case. Also shown are the 62° C. and 13° C. isotherms. The lost work is minimized as the overall process approaches a perfectly isothermal process. This can be achieved through heat transfer enhancement by actively cooling the gas (G) during compression, warming the gas (G) during expansion, and keeping it as close to adiabatic as possible during the pause periods.

Figure 5:
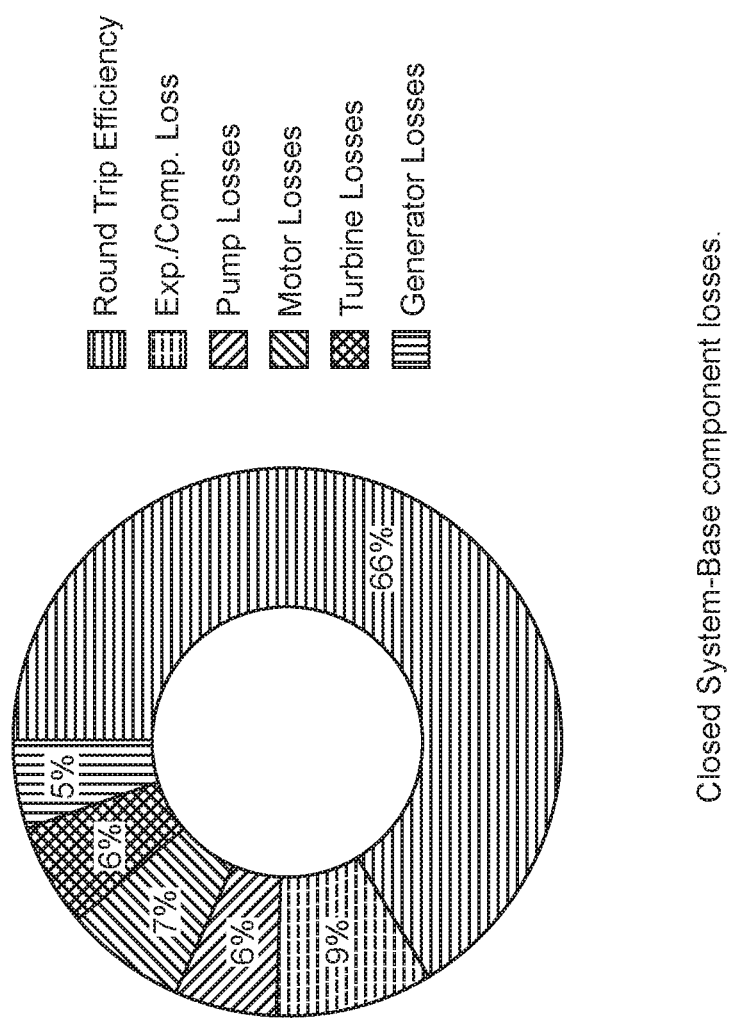
FIG. 5 is a doughnut chart illustrating component efficiencies of a base closed system using continuous charging.

Note that the above cycle analysis does not include efficiency losses due to pump, turbine, and generator inefficiencies. In accounting for pump, turbine, and electric generator losses, the 91% indicated thermodynamic efficiency reduces to 66% electrical-to-electrical round-trip efficiency (RTE). In FIG. 5, the breakdown of efficiency losses by component is shown, with the greatest loss of efficiency coming from the expansion/compression of the pressurized gas (G) occurring non-isothermally. Note that the sum of the (RTE), pump losses, motor losses, turbine losses, and generator losses defines the indicated efficiency of the cycle. If perfectly isothermal compression and expansion are achieved, the expansion/compression losses would drop to zero (100% indicated efficiency), and system losses would be solely due to turbomachine inefficiencies. Due to oversized pipe diameter, piping losses during expansion are negligible (<1%) and not shown here.

Pulsed Storage.

The speed at which the charging/compression process occurs during the storage cycle plays an important role in how much the process departs from being an ideal isothermal process. The slower the compression process can be made, the closer to isothermal the process will be. This can be achieved by utilizing a large total volume of high pressure vessels 104, or by using a small pump 110 and charging at a reduced rate. One strategy to increase charging time with the 35 L/min positive displacement pump 110 selected for the prototype is to pulse the charging pump on and off. A control strategy can be employed to shut the pump 110 off when the pressurized gas (G) temperature warms to a certain temperature, and let it cool down to a certain temperature before restarting the pump 110.

Figure 6:
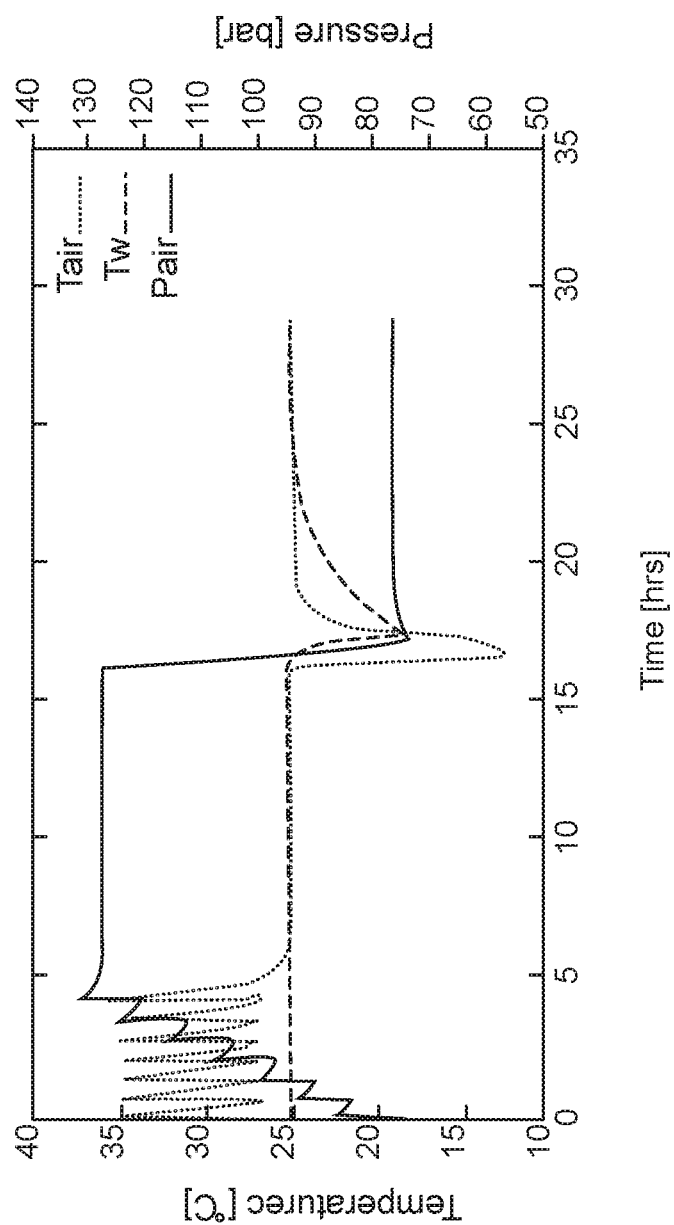
FIG. 6 is a graph illustrating the transient temperature and pressure profiles of a base closed system using pulsed charging.

FIG. 6 shows the temperature and pressure profiles for a charging cycle where the pump 110 is shutoff when the pressurized gas (G) warms to 10 degrees above ambient, and is allowed to cool down to 2 degrees above ambient before the pump 110 is restarted. This limits the peak gas (G) temperature to 35° C. compared to the 62° C. realized when charging occurs continuously in the base storage cycle described above.

Figure 7:
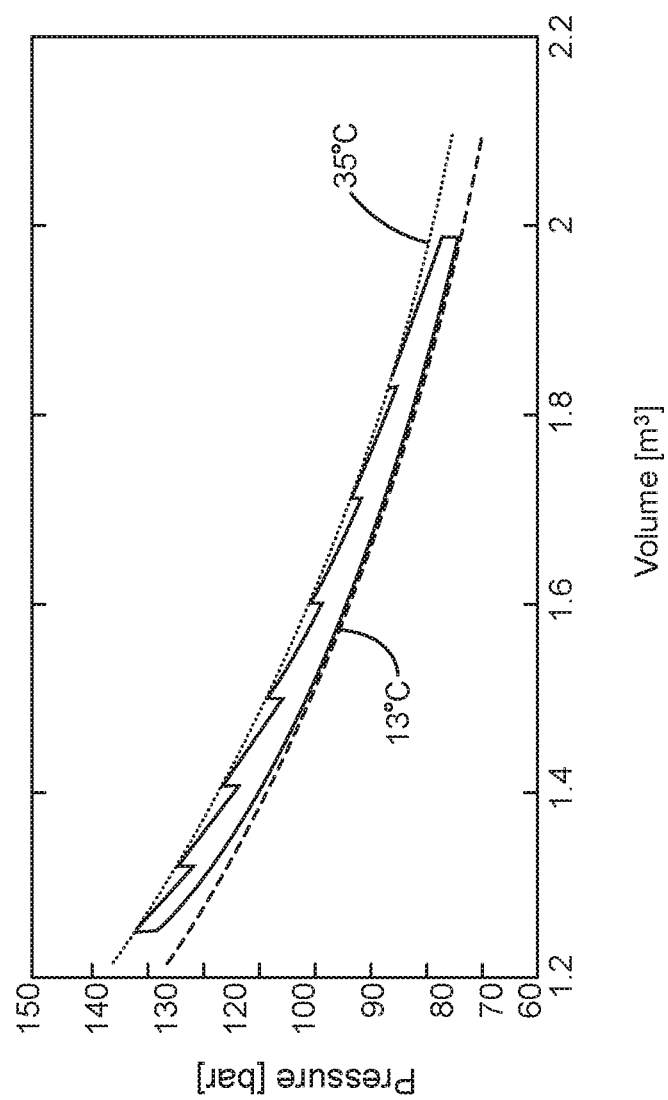
FIG. 7 is a p-v diagram of a base closed system using pulsed charging.

As seen in the p-V diagram shown in FIG. 7, employing this pulsed storage cycle reduces the amount of work lost due to gas (G) expansion/compression not occurring isothermally. The compression line on the p-V diagram closely follows the 35° C. isotherm, instead of the 62° C. isotherm in the base cycle, resulting in significant efficiency gains.

Figure 8:
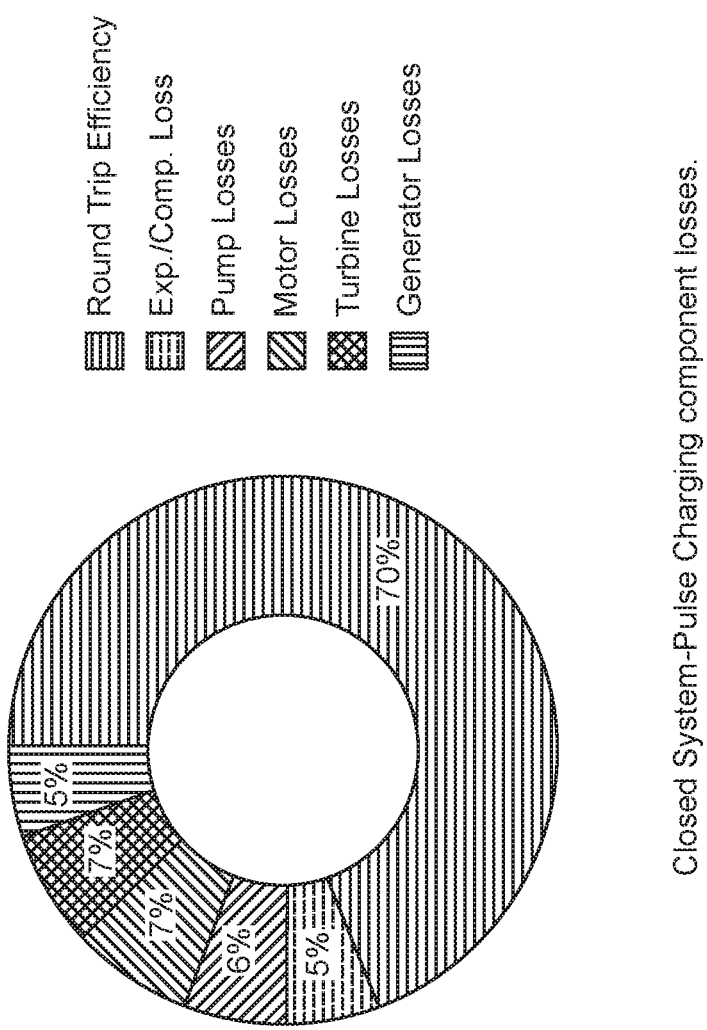
FIG. 8 is a doughnut chart illustrating component efficiencies of a base closed system using pulsed charging.

FIG. 8 summarizes the efficiency gains realized by pulse charging the system. The expansion/compression losses reduce from 9% to 5%, with round trip efficiency increasing from 66% to 70%. This is a significant gain in efficiency, considering that it is realized simply by pulsing the pump 110 on and off six (6) times and allowing the gas (G) to cool between pulses during the energy storage cycle.

Heat Transfer Enhancements.

Figure 9:
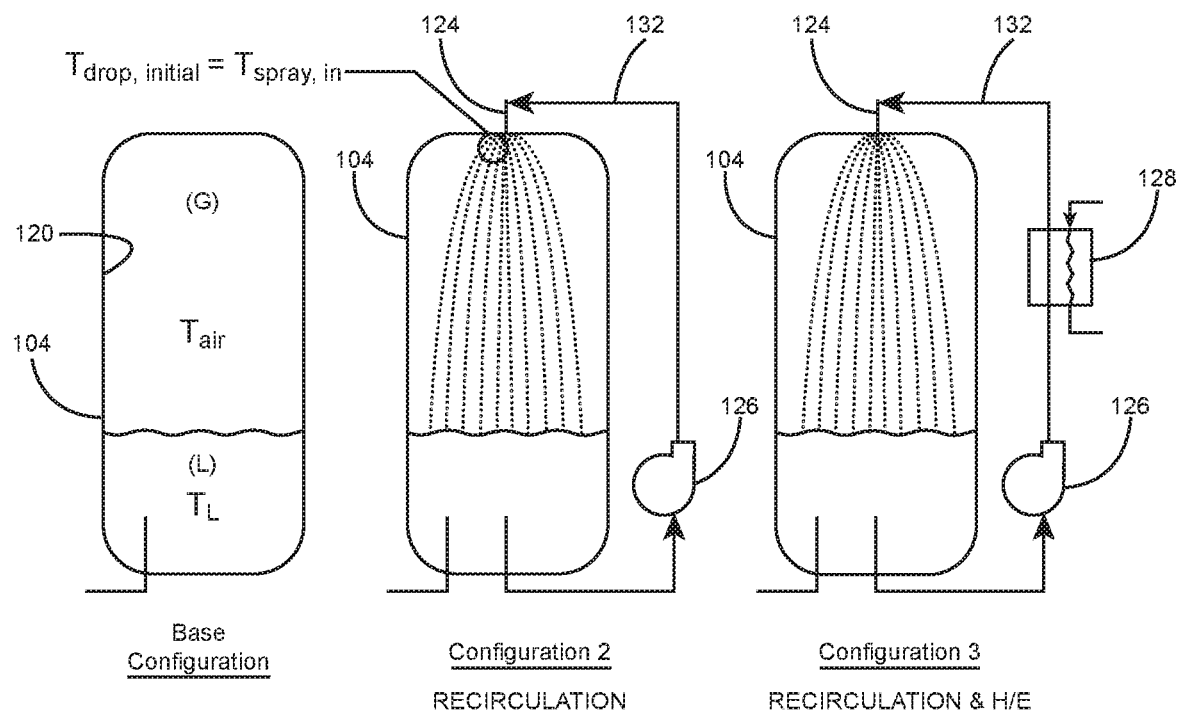
FIG. 9 is a schematic illustration of a pressure vessel in a base configuration, a pressure vessel using recirculation and a pressure vessel using recirculation with a heat exchanger.
Figure 10:
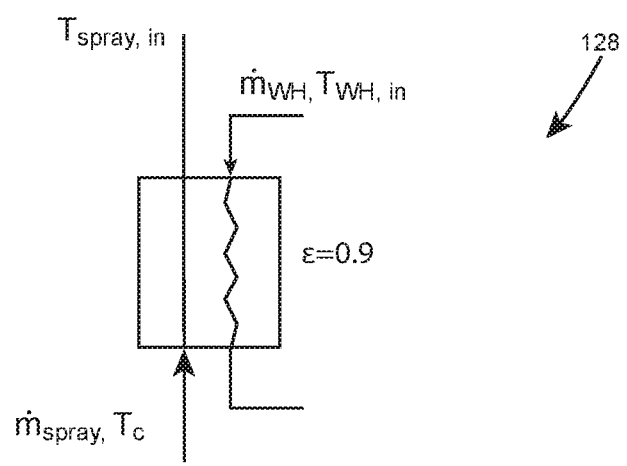
FIG. 10 is schematic illustration of a waste heat exchanger thermal model.

Another mechanism that can be employed to improve system performance is heat transfer enhancements. Enhancing heat transfer to and from the pressurized gas (G) during expansion and compression helps to minimize temperature transients and allows the storage and extraction cycles to further approach the ideal isothermal case. There are a number of ways that heat transfer enhancements can be achieved. For example, working liquid (L) can be sprayed into the pressure vessel 104 as a mist from a nozzle 124 above as shown in FIG. 9. Configuration 2 incorporates recirculation with a pump 126 only and configuration 3 incorporates recirculation with a pump 124 and a heat exchanger 128. Each configuration has a cooling effect on the pressurized gas (G) as the working liquid (L) cascades to the bottom of the pressure vessel 104. Extended surface features such as ribs and pedestals can also be added to the inside or outside of the pressure vessel 104 walls, increasing the heat transfer surface area (not shown).

In order to model the effect of the direct contact heat exchange between the gas and the working liquid obtained via spraying, the following formulation is utilized. First, it is assumed that the droplets fall at constant terminal velocity, thus, the drag force and the gravity force on each droplet are balanced, and the terminal velocity can be calculated with equation 9.

$$v_{terminal} = \sqrt{\frac{4 D_{drop} \rho_{drop} g}{3 \rho_{air} C_D}} \quad (9)$$

Note that using the terminal velocity is a conservative estimate for droplet speed, as the droplets could be falling faster than terminal velocity during gas (G) expansion when the liquid (L) droplets are warmer than the gas (G). Obtaining the terminal velocity allows for the calculation of the droplet travel time or residence time in the gas (G) using equation 10, since the distance from the top of the pressurized vessels to the liquid (L) level below is known.

$$t_{travel} = \frac{L}{v_{terminal}} \quad (10)$$

Figure 11:
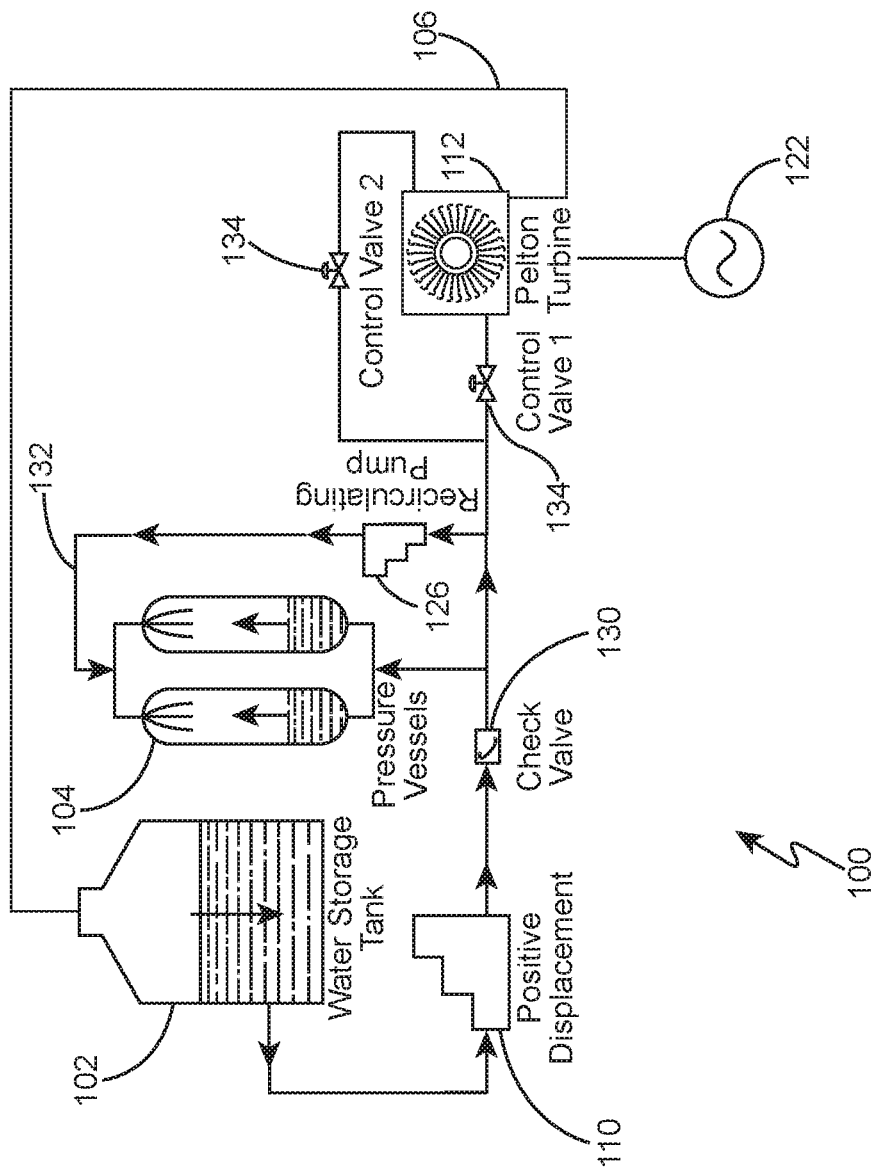
FIG. 11 is a schematic illustration of a closed system using recirculation in an energy storage cycle.

The flow rate of working liquid (L) being sprayed is a set fixed parameter, so knowing this value, the number of droplets being generated per unit time can be calculated with equation 11.

$$\dot{N}_{drops} = \frac{6\dot{V}_{spray}}{\pi D_{drop}^3} \tag{11}$$

Using the above value and the residence time of droplets, the total number of droplets of working liquid (L) travelling through the gas (G) at any given instance in time is computed using equation 12.

$$N_{drops} = \dot{N}_{drops} \cdot t_{travel} \tag{12}$$

Next, the transient temperature profile for a droplet is calculated from equation 13. This expression assumes lumped capacitance (Bi<1) which can be verified after calculation. The temperature of the droplets right before hitting the bulk liquid (L) at the bottom of the pressure vessel is calculated, given the gas (G) temperature and the initial temperature of the drop of working liquid (L) at the outlet of the spray nozzle.

$$\frac{T_{drop} - T_{air}}{T_{drop,initial} - T_{air}} - e^{-\frac{t_{travel}}{\tau_{drop}}} \tag{13}$$

Tau (τdrop) is interpreted as the thermal time constant of the working liquid (L) droplet and can be expressed by equation 14.

$$\tau_{drop} = \frac{\rho_{drop} V_{drop} c_{drop}}{h_{drop}, A_{s,drop}} \tag{14}$$

Next, the Nusselt number for the drops is calculated using the Ranz and Marshall correlation for a falling drop with equation 15.

$$Nu_{drop} = 2 + 0.6 Re_{air}^{1/2} Pr^{1/3} \tag{15}$$

And the resulting heat transfer coefficient is calculated using equation 16.

$$h_{drop} = \frac{Nu \cdot k_{drop}}{D_{drop}} \tag{16}$$

Given the above, the heat loss (or gain) from the drops can be calculated as seen in equation 17 given the inlet and outlet temperatures of the drops. Note again that the outlet temperature is taken as the temperature of the drop right before hitting the bulk liquid (L) at the bottom of the pressure vessel, and the inlet temperature is taken as the temperature of the drop upon exiting the spray nozzle.

$$q_{drop} = \rho_{drop} V_{drop} c_{drop} (T_{drop,out} - T_{drop,in}) \tag{17}$$

The rate of heat loss from the entire spray is then calculated as follows in equation 18.

$$\dot{q}_{drops} = \dot{N}_{drops} \cdot q_{drop} \tag{18}$$

A mixing equation 19 is then applied to calculate the effect that the droplets have on the temperature of the bulk liquid (L) at the bottom of the pressure vessels. The enthalpy of the drops plus the enthalpy of the bulk liquid (pre-mixing) must equal the enthalpy of the combined liquid mixture (droplets plus bulk liquid).

$$T_{w,mixed} = \frac{\dot{m}_{drop} \tau_{drop} c_{drop} T_{drop} + m_L c_L T_L}{(\dot{m}_{drop} \tau_{drop} + m_L) c_L} \tag{19}$$

The effect of this heat transfer is included in the energy balance for the gas (e.g., air) as follows. Recall that equation 20 is the gas (e.g., air) energy equation without any spray cooling/warming.

$$m_{air} c_{v,air} \frac{dT_{air}}{dt} = -h_{A,L} A_{A,L} (T_{air} - T_L) - UA_1 (T_{air} - T_{amb}) - p_{air} \frac{dV_{air}}{dt} \tag{20}$$

The rate of heat loss from the spray is added to the right hand side of the equation to account for heat loss or gain due to spray cooling/warming, resulting in equation 21.

$$m_{air} c_{v,air} \frac{dT_{air}}{dt} = -h_{A,L} A_{A,L} (T_{air} - T_L) - UA_1 (T_{air} - T_{amb}) - \dot{q}_{drops} - p_{air} \frac{dV_{air}}{dt} \tag{21}$$

Note that no mass transfer, due to possible evaporation of the working liquid (L) droplets, is modeled. The above equations are calculated on a time-step basis for each one second time-step in the simulation.

To integrate the waste heat exchanger, a 90% efficient heat exchanger (ε=0.9) is assumed with water as the heat transfer fluid on the waste heat side and analyzed for a waste heat stream flowing at 5 L/min and various assumed waste heat inlet temperatures. FIG. 10 and equations 22 and 23 show the waste heat exchanger model.

$$\varepsilon = \frac{\dot{m}_{WH}(T_{WH,in} - T_{WH,out})}{\dot{m}_{min}(T_{WH,in} - T_L)} = \frac{\dot{m}_{spray}(T_{spray,in} - T_L)}{\dot{m}_{min}(T_{WH,in} - T_L)} \tag{22}$$

$$T_{spray,in} = T_L + \varepsilon \frac{\dot{m}_{min}}{\dot{m}_{spray}} (T_{WH,in} - T_L) \tag{23}$$

Recirculation of the Working Liquid.

With reference now to FIGS. 11 and 12, a ground-level energy storage and extraction system 100 having means for influencing the temperature and pressure of the pressurized gas (G) will now be described. In this example, excess electricity (e.g. from renewable sources or during off-peak periods when peak demand shifting is the goal) is used power a pump 110 to direct a working liquid (L) into pressure vessel(s) 104 filled with a high pressure gas (G), as shown in the energy storage cycle of FIG. 11. In this particular example, a check valve 130 is fluidly connected between the pump 110 and the pressure vessels 104 to isolate a working liquid (L) recirculation circuit 132. A recirculation pump 126 is fluidly coupled between the lower portions of the pressure vessels 104, containing the working liquid (L), and the upper portions of the pressure vessels 104, containing the pressurized gas (G). The working liquid (L) is recirculated with the recirculation pump 126 and sprayed from one or more nozzles 124 located at the top of the pressurized vessels 104. Alternatively, a pump submerged inside the pressure vessels can be used for spraying. The pump can be powered by wire or wirelessly from outside the tanks. The cascading spray reduces the heat generated due to compression of the pressurized gas (G), bringing the compression process near isothermal and, thermodynamically, this is the most efficient compression process. The energy storage cycle is stopped when the maximum working pressure of the gas (G) is reached.

Figure 12:
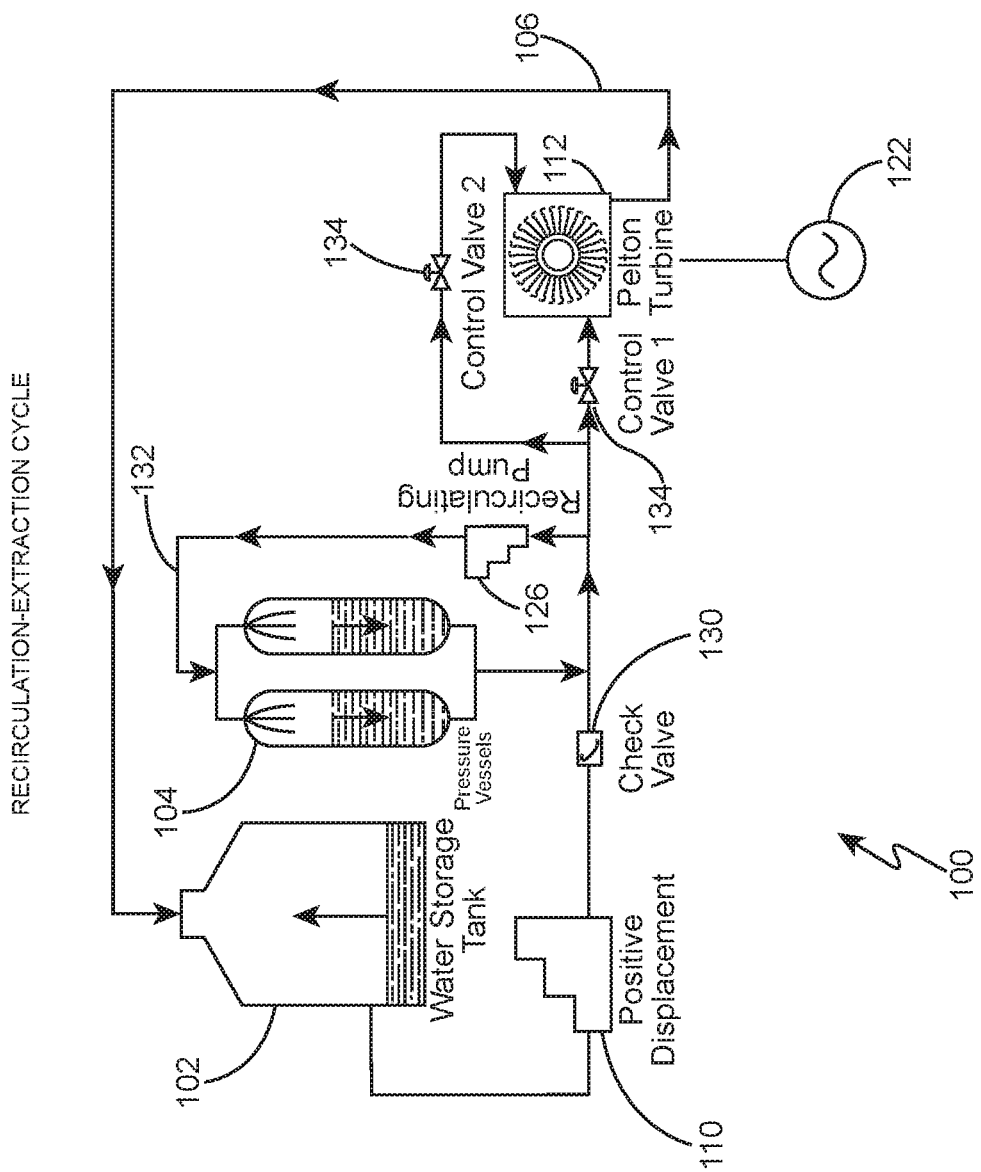
FIG. 12 is a schematic illustration of a closed system using recirculation in an energy extraction cycle.

During the energy extraction cycle of FIG. 12, one or more control valves 134 are opened, allowing the working liquid (L) to discharge from the pressure vessels 104 and to flow through the hydropower turbine 112, which is coupled to an electrical generator 122 for powering a load. To overcome the decreased temperature of the pressurized gas (G) during the expansion process, working liquid (L) is again recirculated from the bottom of the pressure vessels 104 by the recirculation pump 126 and is sprayed by the nozzles 124 into the top of the pressure vessels 104. This recirculation of working liquid (L) warms the pressurized gas (G), increasing the gas temperature and the pressure acting on the working liquid (L). The higher-pressure working liquid (L) increases the available energy to be extracted, hence improving the system's 100 overall efficiency.

Figure 13:
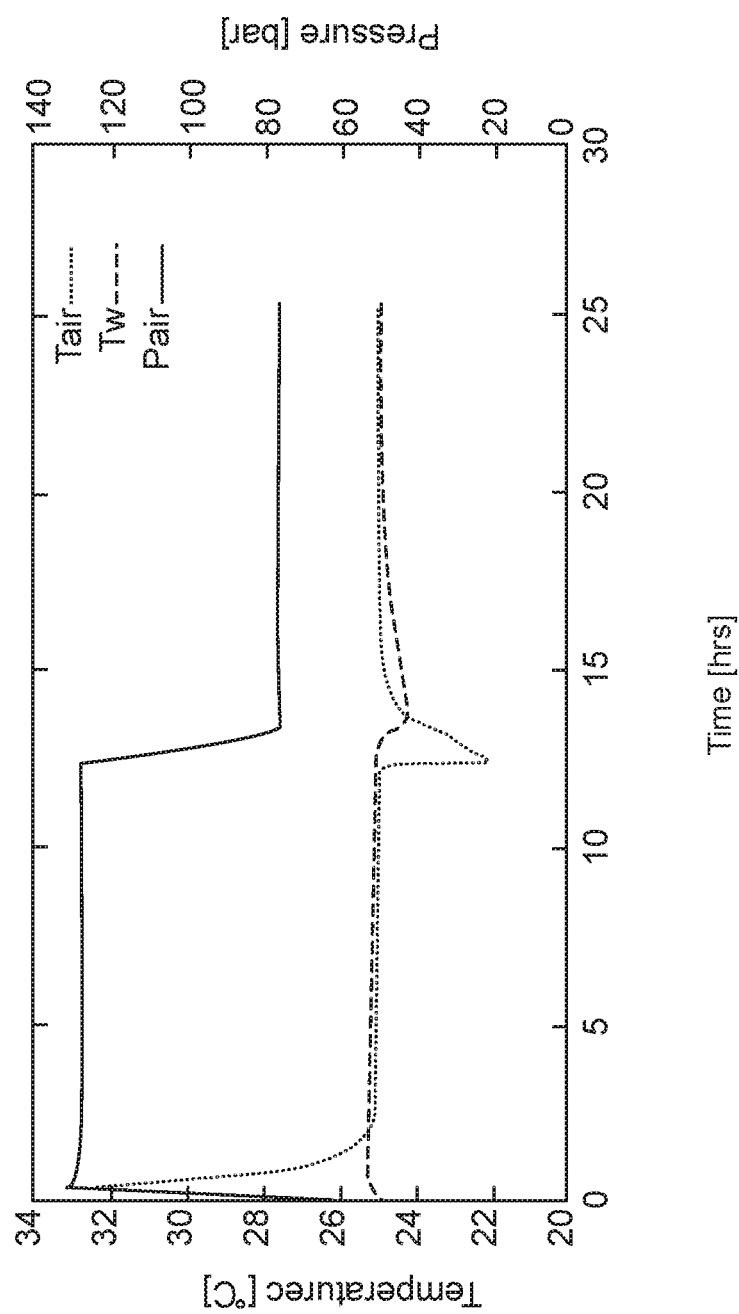
FIG. 13 is a graph illustrating the transient temperature and pressure profiles of a closed system using recirculation.

FIG. 13 shows the transient temperature and pressure profiles for the pressurized gas (G), and temperature profile for the working liquid (L) of the system with recirculation. It can be seen that the recirculation and spraying reduces the maximum and minimum gas temperatures as compared with the base configuration. The maximum cycle temperature reduces from 62° C. to 32° C., and the minimum increases from 13° C. to 22° C.

Figure 14:
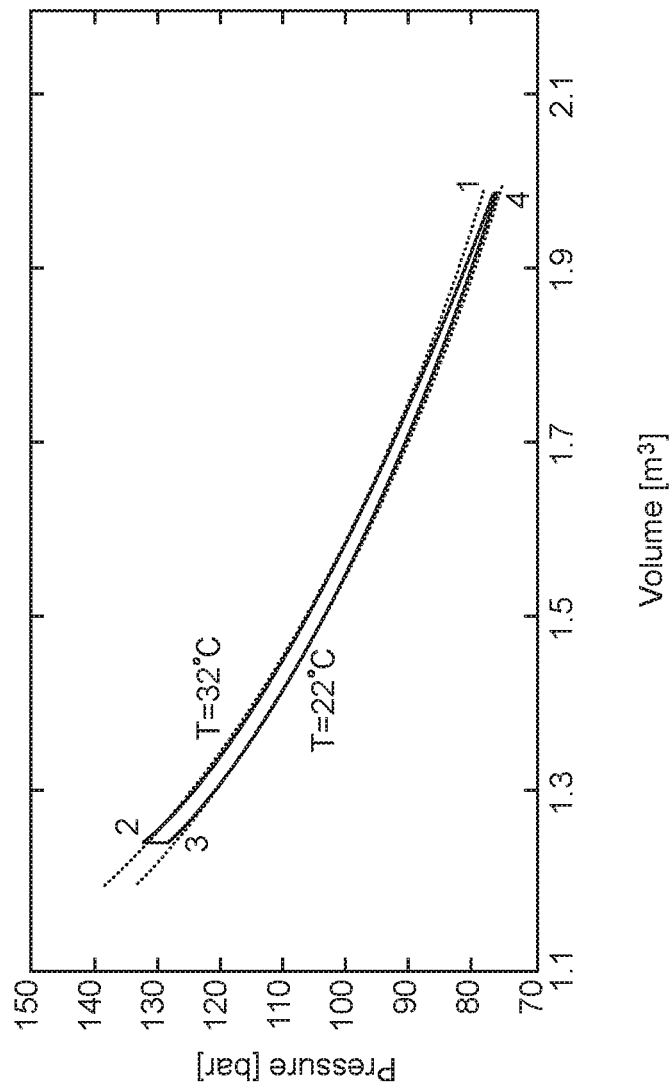
FIG. 14 is a p-v diagram of a closed system using recirculation.

FIG. 14 shows a p-V diagram for the system with recirculation. There is a noticeable decrease in lost work due to expansion/compression which is represented in the thinner p-V curve, as the isotherms are brought closer to the ideal (isothermal) case. The 22° C. and 32° C. isotherms are shown for comparison.

Figure 15:
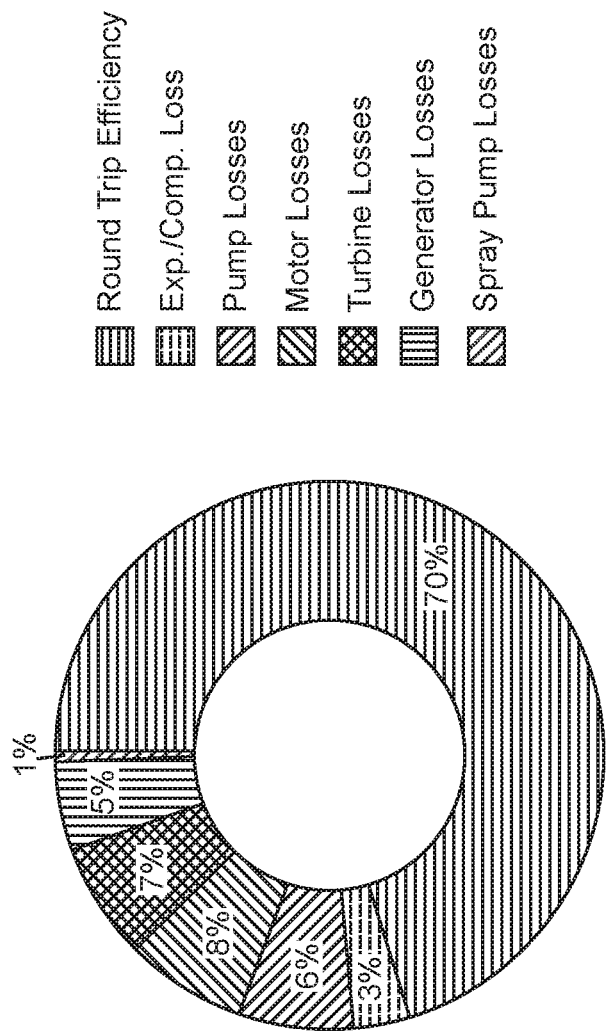
FIG. 15 is a doughnut chart illustrating component efficiencies of a closed system using recirculation.

FIG. 15 summarizes the efficiency gains realized by utilizing recirculation in the system 100. The expansion/compression losses reduce to 3%, with round trip efficiency increasing to 70%. Spraying at 12 L/min with a nozzle producing average drop diameter Ddrop=50 µm results in a 4% boost in RTE from 66% to 70%. Accounting for the pumping power required to overcome the spray nozzle pressure drop introduces a new category of loss, but these spray pump losses account for RTE losses of less than 1%. The spray flow rate should then be optimized to determine the optimal spray flow rate for each specific system 100.

Recirculation and a Heat Exchanger.

According to the U.S. Energy Information Administration (EIA), space cooling consumes 12% of total primary residential energy consumption and 9% in the commercial sector. This leads to a large amount of waste heat rejected to the ambient air from the HVAC condenser. The ground-level energy storage and extraction system is capable of utilizing this free waste heat to augment its power generation of the stored energy as further described below.

Figure 16:
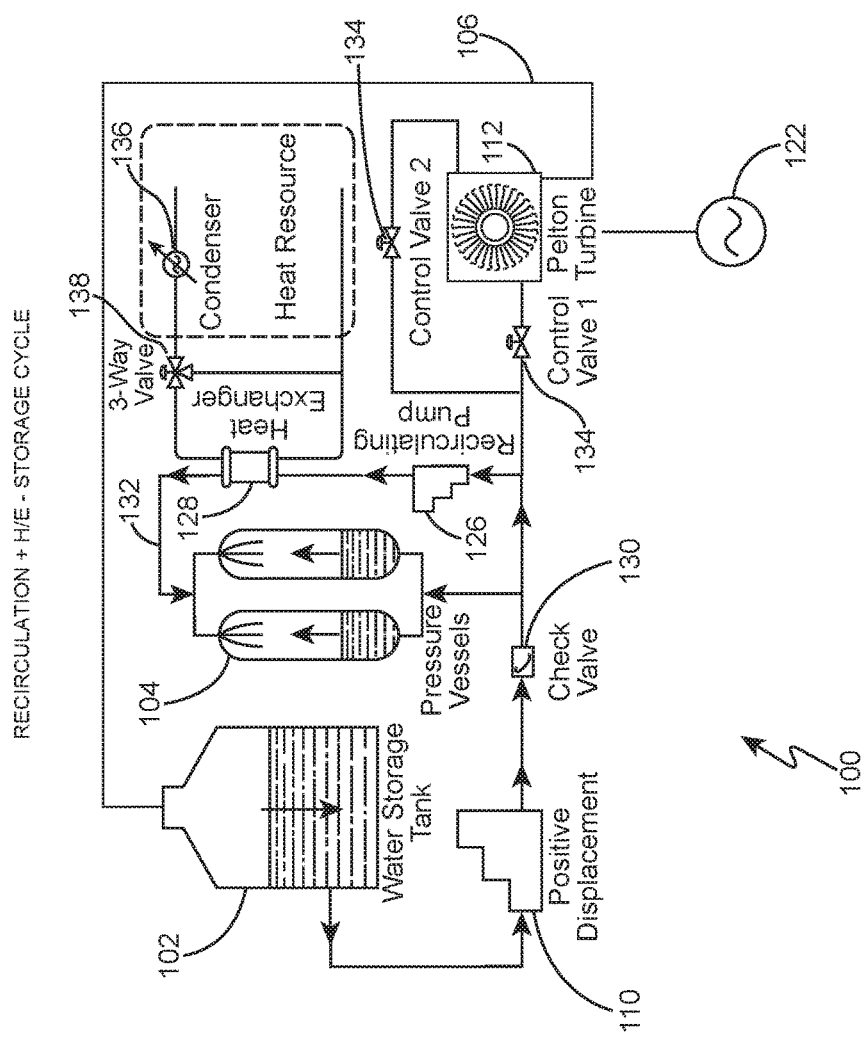
FIG. 16 is a schematic illustration of a closed system using recirculation and a heat exchanger in an energy storage cycle. Waste heat from condenser, geothermal, solar or other resources can tie into the system through this heat exchanger.
Figure 17:
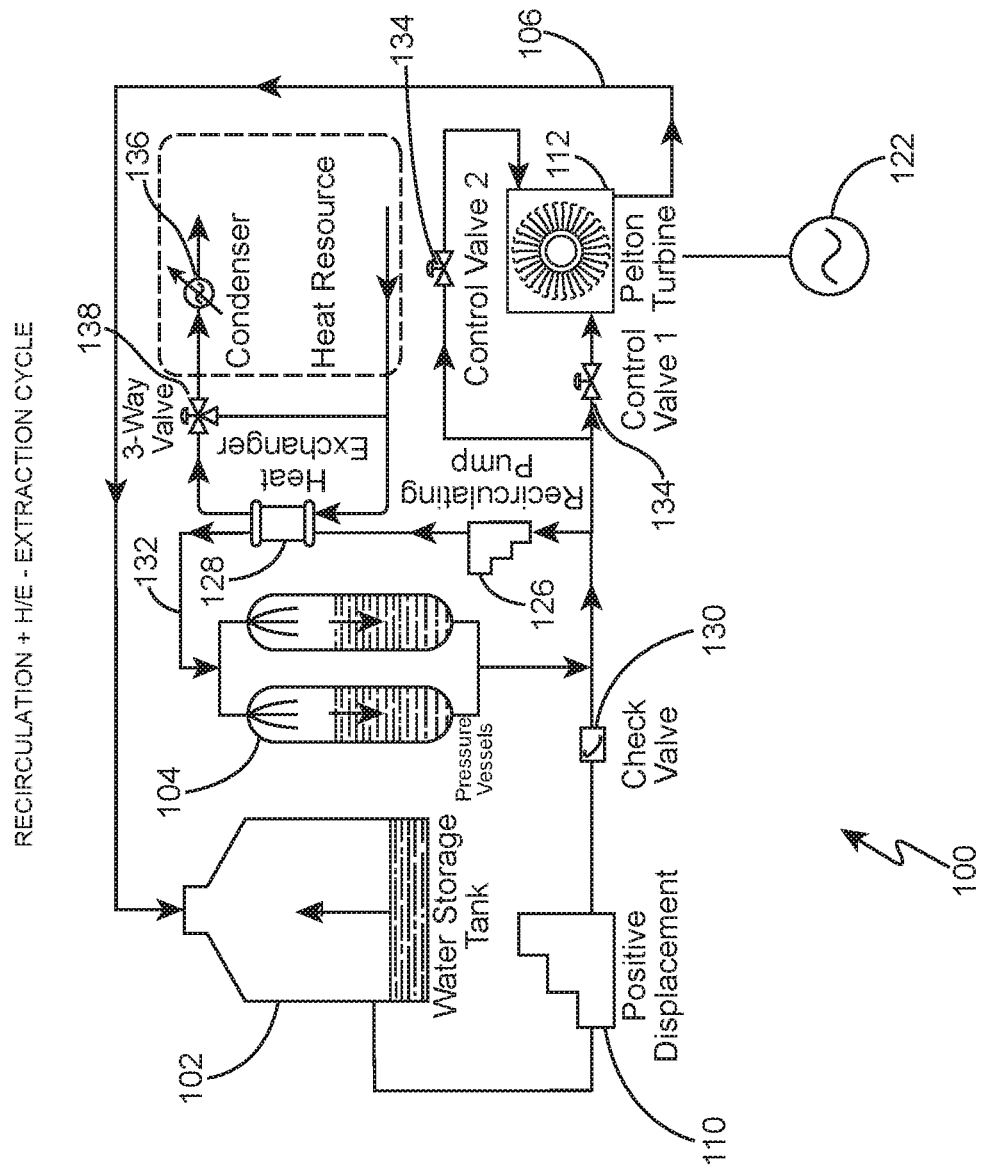
FIG. 17 is a schematic illustration of a closed system using recirculation and a heat exchanger in an energy extraction cycle.

With reference now to FIGS. 16 and 17, a ground-level energy storage and extraction system 100 with additional means for influencing the temperature and pressure of the pressurized gas (G) will now be described. In this example, excess electricity (e.g. from renewable sources or during off-peak periods when peak demand shifting is the goal) powers a pump 110 that directs a working liquid (L) into pressure vessels 104 filled with a high pressure gas (G), as shown in the energy storage cycle of FIG. 16. In this particular example, a check valve 130 is fluidly connected between the pump 110 and the pressure vessels 104 to isolate a working liquid (L) recirculation circuit 132. A recirculating pump 126 is fluidly coupled between the lower portions of the pressure vessels 104, containing the working liquid (L), and the upper portions of the pressure vessels 104, containing the pressurized gas (G). A heat exchanger 128 is thermally coupled to the recirculation circuit 132 and accepts a refrigerant from a condenser 136 circuit of the building air conditioning system (HVAC) to heat the working liquid (L) as needed (note: the heat can also come from other resources including and not limited to: heat pump, solar, geothermal, gas, combustion, stack of CHP, power plants, cooling towers, heat exchangers and etc).

During the energy storage cycle of FIG. 16, the working liquid (L) is directed by pump 110 to the bottom of the pressure vessels 104 and is also recirculated with the recirculation pump 126 and sprayed from nozzles 124 located at the top of the pressurized vessels 104. The spray reduces the heat generated due to compression of the pressurized gas (G), bringing the compression process near isothermal and, thermodynamically, this is the most efficient compression process. A three-way valve 138 is configured to direct the refrigerant to bypass the heat exchanger 128 during the energy storage cycle, and the energy storage cycle is finally stopped when the maximum working pressure of the gas (G) is reached.

During the energy extraction cycle of FIG. 17, one or more control valves 134 are opened, allowing the working liquid (L) to discharge from the pressure vessels 104 and to flow through the hydropower turbine 112, which is coupled to an electrical generator 122 for powering a load. To overcome the decreased temperature of the pressurized gas (G) during the expansion process, the three-way valve 138 is configured to direct refrigerant to flow through the heat exchanger 128. Now, the working liquid (L) is recirculated from the bottom of the pressure vessels 104 and is directed through the heat exchanger 128 to heat the working liquid (L). The heated working liquid (L) is then sprayed by nozzles 124 into the top of the pressure vessels 104. This recirculation and heat exchange warms the pressurized gas (G) on top of the working liquid (L), increasing the gas (G) temperature and the pressure acting on the working liquid (L). The higher-pressure working liquid (L) increases the available energy to be extracted, hence improving the system's overall efficiency. At the same time, the efficiency of the air conditioning (HVAC) system is also increased by providing refrigerant subcooling. When the air conditioning system is in operation while the energy storage and extraction system 100 is idle, the three-way valve 138 directs the refrigerant to bypass the heat exchanger 128.

Figure 18:
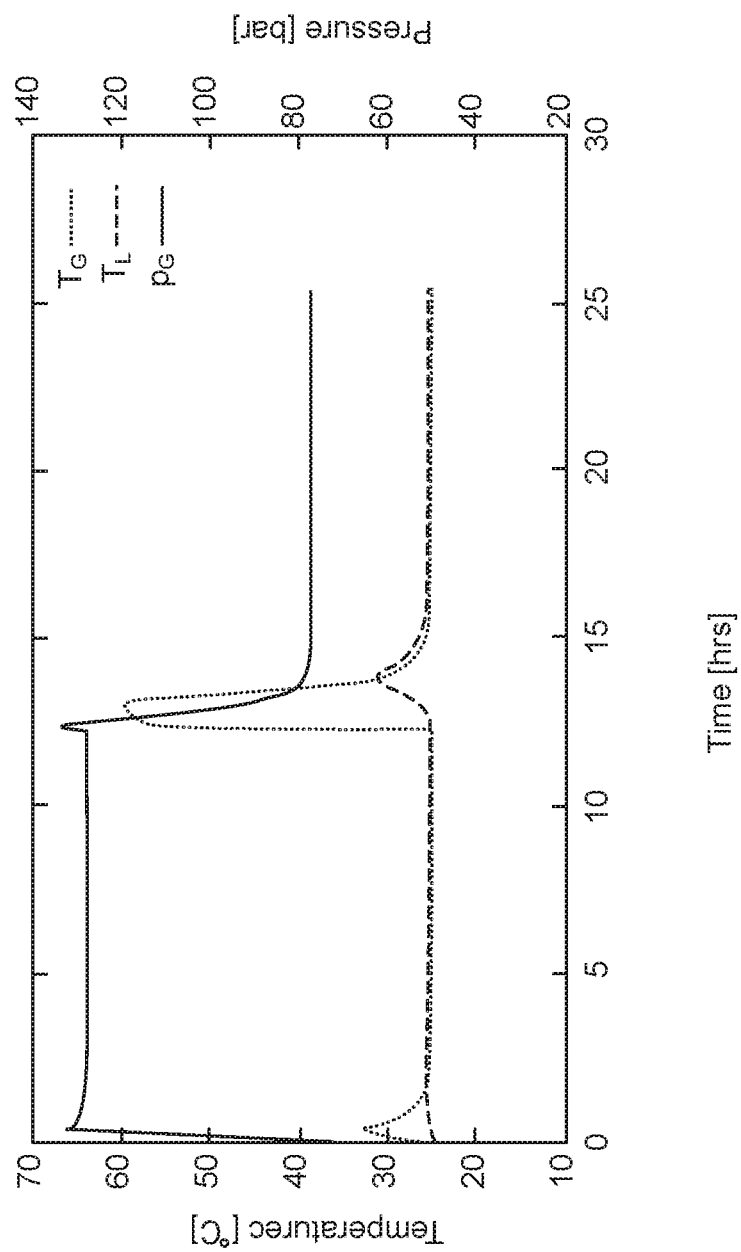
FIG. 18 is a graph illustrating the transient temperature and pressure profiles of a closed system using recirculation and a heat exchanger.

FIG. 18 shows the transient temperature and pressure profiles for the pressurized gas (G), and temperature profile for the working liquid (L) of the system with recirculation and a heat exchanger added between the recirculation pump and the pressurized vessel. In this example, waste heat is simulated as a stream with inlet water at 70° C.; this results in the temperature and pressure profiles seen in FIG. 18. The cooling during expansion is completely overcome and reversed to a net warming to about 39° C. (note: the heat can also come from other resources including and not limited to: solar, geothermal, gas, combustion, stack of CHP, power plants, cooling towers, heat exchangers and etc). The minimum cycle temperature is then left as the initial ambient temperature of 25° C.

Figure 19:
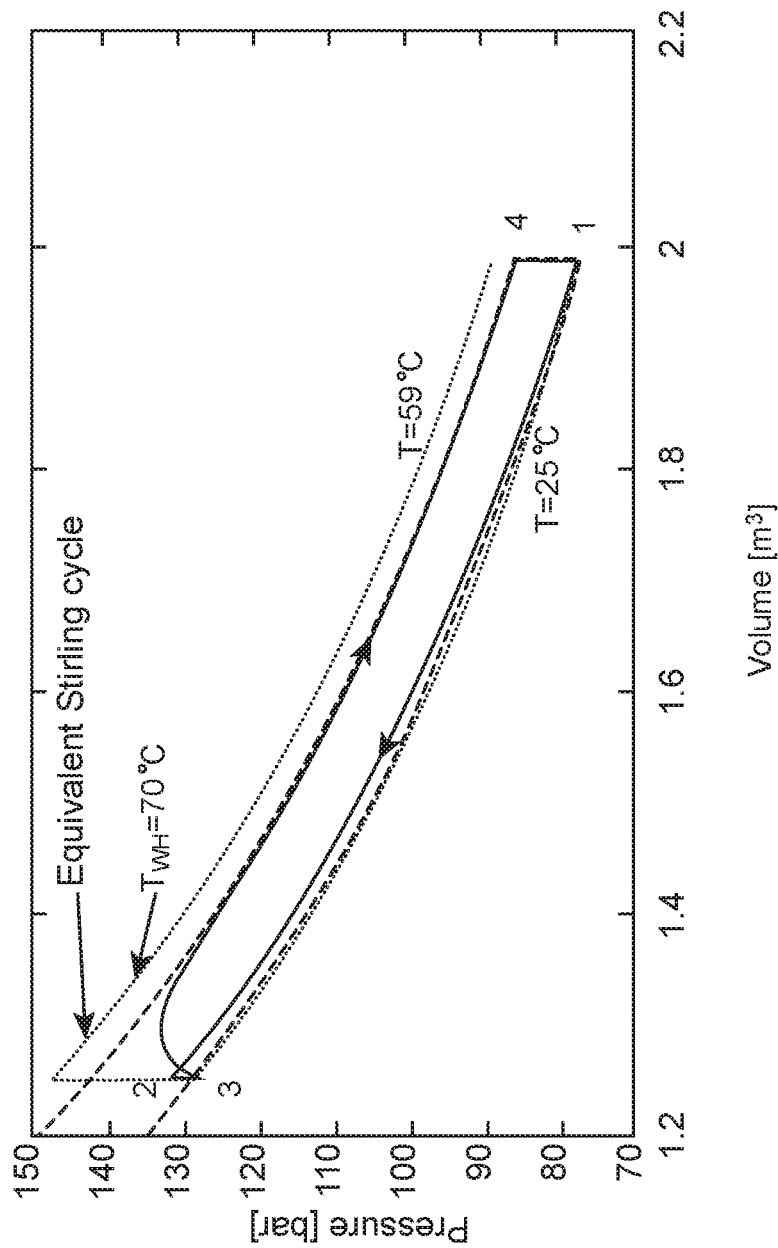
FIG. 19 is a p-v diagram of a closed system using recirculation and a heat exchange.
Figure 21:
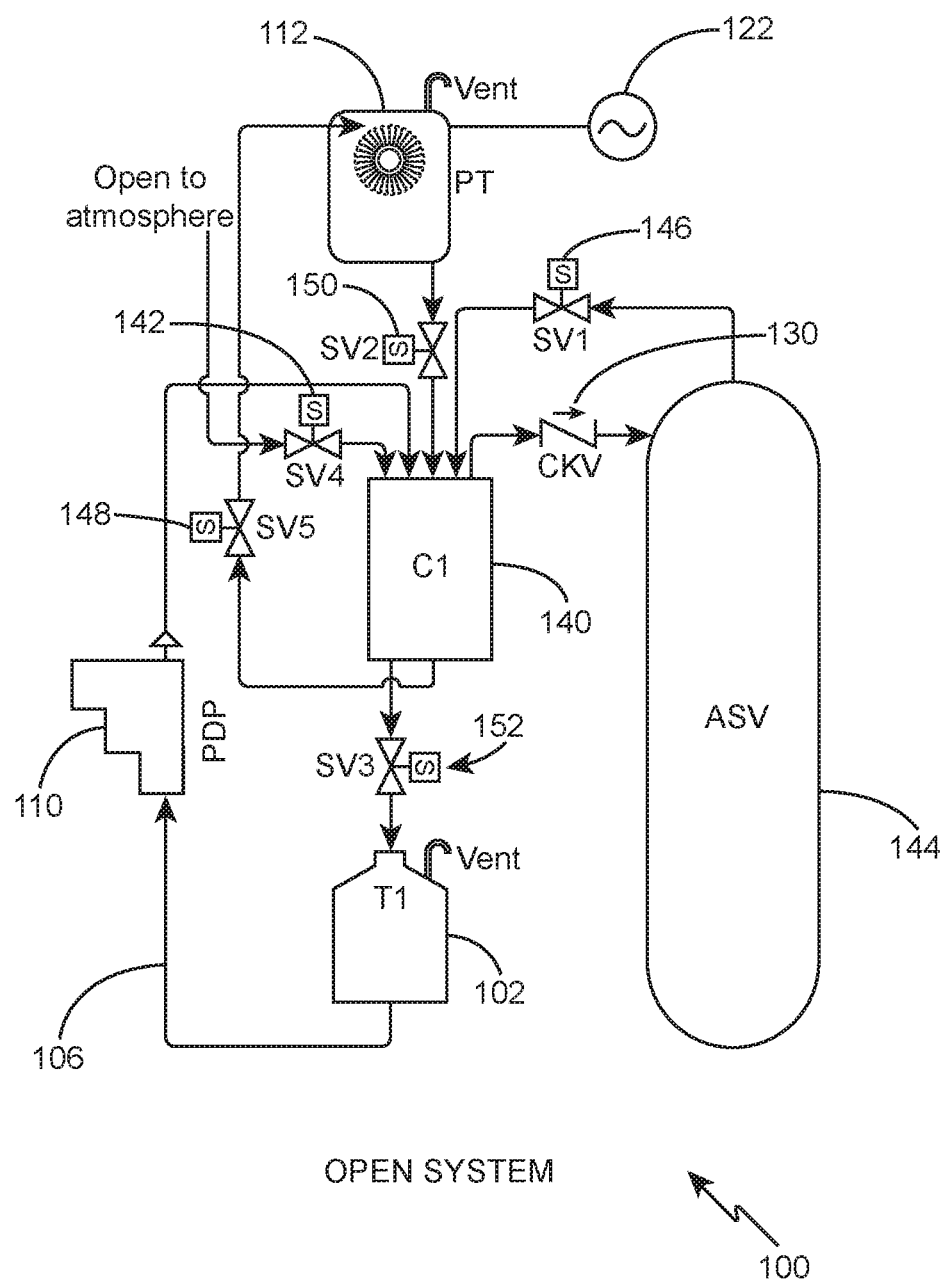
FIG. 21 is a schematic illustration of an open system.

FIG. 19 shows a p-V diagram of the system with recirculation and a heat exchanger. Because of the large boost in expansion temperature, the area under the expansion curve is now larger than the area under the compression curve, meaning that more hydraulic work is extracted from the system than is initially stored due to the thermal boost from the air conditioning system. Essentially, the thermodynamic efficiency is greater than one and equal to ηthermo=1.0136 and some of the auxiliary losses due to the pump/motor and turbine/generator are recovered, resulting in RTE=78%.

FIG. 20 summarizes the efficiencies of the three system configurations where: the base configuration utilizes no recirculation; configuration 1 utilizes recirculation only; and configuration 3 utilizes recirculation and a heat exchanger with three different waste heat temperatures shown.

Open Systems.

FIGS. 21-25 show a system 100 having an open compressed gas (e.g., air) storage thermodynamic cycle, which significantly increases the energy density while also reducing the compression losses. By open cycle we mean that the system 100 recharges pressurized gas (G) from ambient air and discharges the gas (G) to the ambient air. Note that the earlier-described systems operate under a closed cycle and the pressurized gas (G) in the system had no connection to the ambient air. The open system 100 reduces the number of components, which potentially further lowers the cost per kilo-watt hour of generated electricity.

In the open system 100, a pump 110, such as a positive displacement pump, directs a working liquid (L) from a reservoir 102 into a cylinder 140 that is vented to the atmosphere through a valve 142 such as an electronically controlled solenoid valve, gate valve, ball valve or the like. Cylinder 140 is fluidly coupled to a pressure vessel 144 through a one-way check valve 130. The Cylinder 140 is also fluidly coupled to the pressure vessel 144 through valve 146. A hydropower turbine 112, such as a Pelton turbine, is fluidly coupled to the bottom of cylinder 140 through valve 148. The hydropower turbine 112 is designed with a working liquid (L) holding capacity large enough to hold the volume of working liquid held in cylinder 140. The hydropower turbine 112 is fluidly coupled from its bottom to cylinder 140 through valve 150. The reservoir 102 is fluidly coupled to the bottom of cylinder 140 (C1) through valve 152. Preferably, the hydropower turbine 112, cylinder 140, and reservoir 102 are physically arranged so that cylinder 140 is positioned above reservoir 102 and hydropower turbine 112 is disposed above cylinder 140 to permit gravity flow of the working liquid (L) between the components during operation. Alternately, pumps may be used to direct the working liquid (L) between components at the expense of system 100 efficiency.

Figure 22:
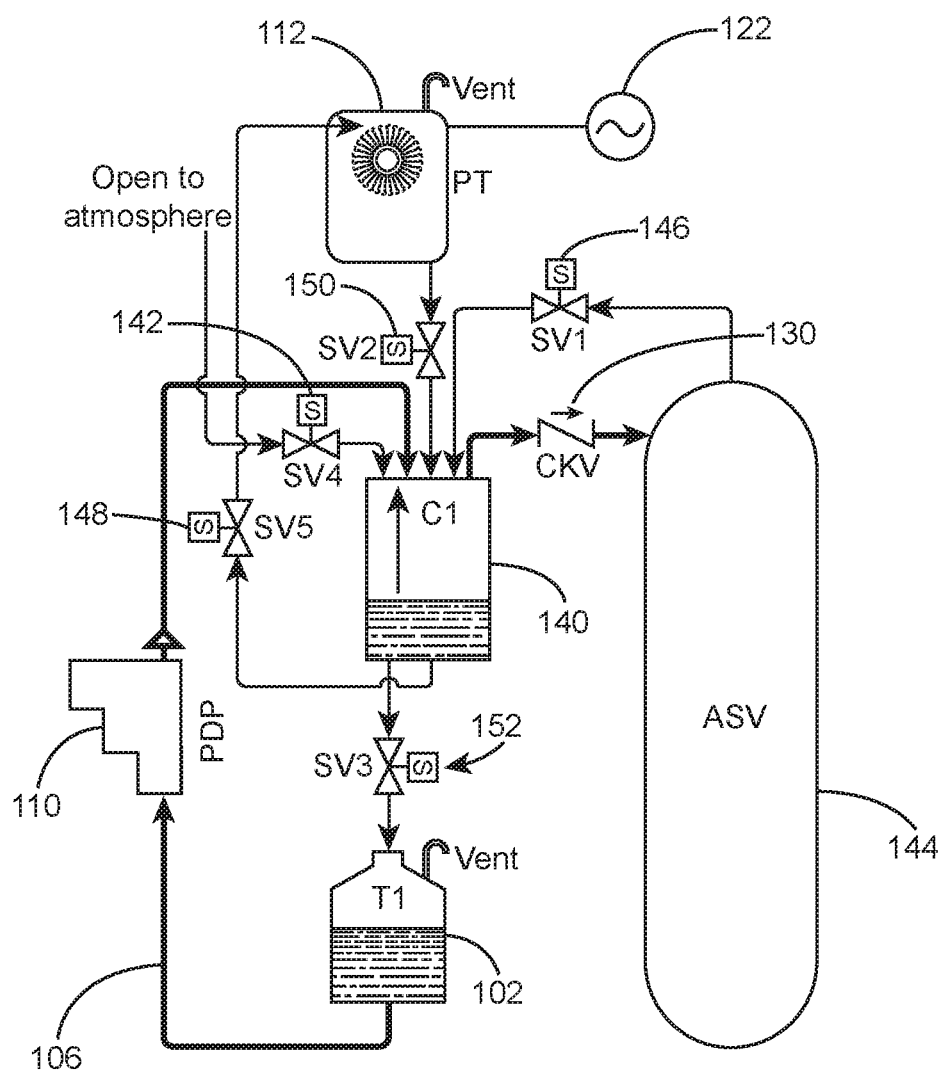
FIG. 22 is a schematic illustration of an open system operating in a first step of an energy storage cycle.

In this open system 100 example, the energy storage cycle occurs in a multi-step process. FIG. 22 illustrates the first step in which the working liquid (L) is directed from the reservoir 102 with pump 110 and sprayed inside of cylinder 140 through nozzles 124. The pump 110 is powered by renewable sources or excess grid capacity at a first time. The pressurized gas (G) in the cylinder 140 is displaced by the working liquid (L) and is directed through the check valve 130 and into the pressure vessel 144. The pumping continues until all the gas (G), initially in the cylinder 140, has been displaced by the working liquid (L). Spraying the working liquid (L) limits the temperature rise of the pressurized gas (G), thus reducing compression losses. At the end of this initial energy storage cycle, all of the working liquid (L) initially in the reservoir has been pumped to cylinder 140. The pump 110 is then stopped.

Figure 23:
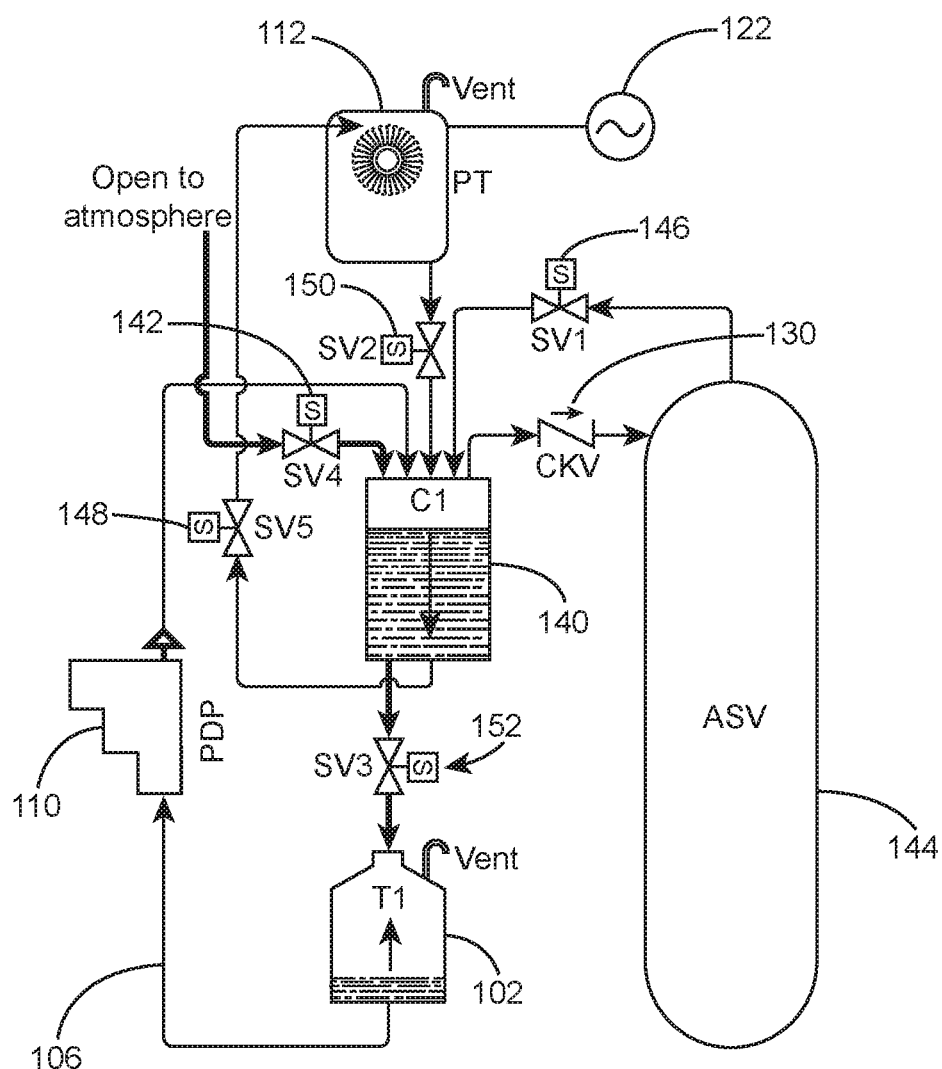
FIG. 23 is a schematic illustration of an open system operating in a second step of an energy storage cycle.
Figure 24:
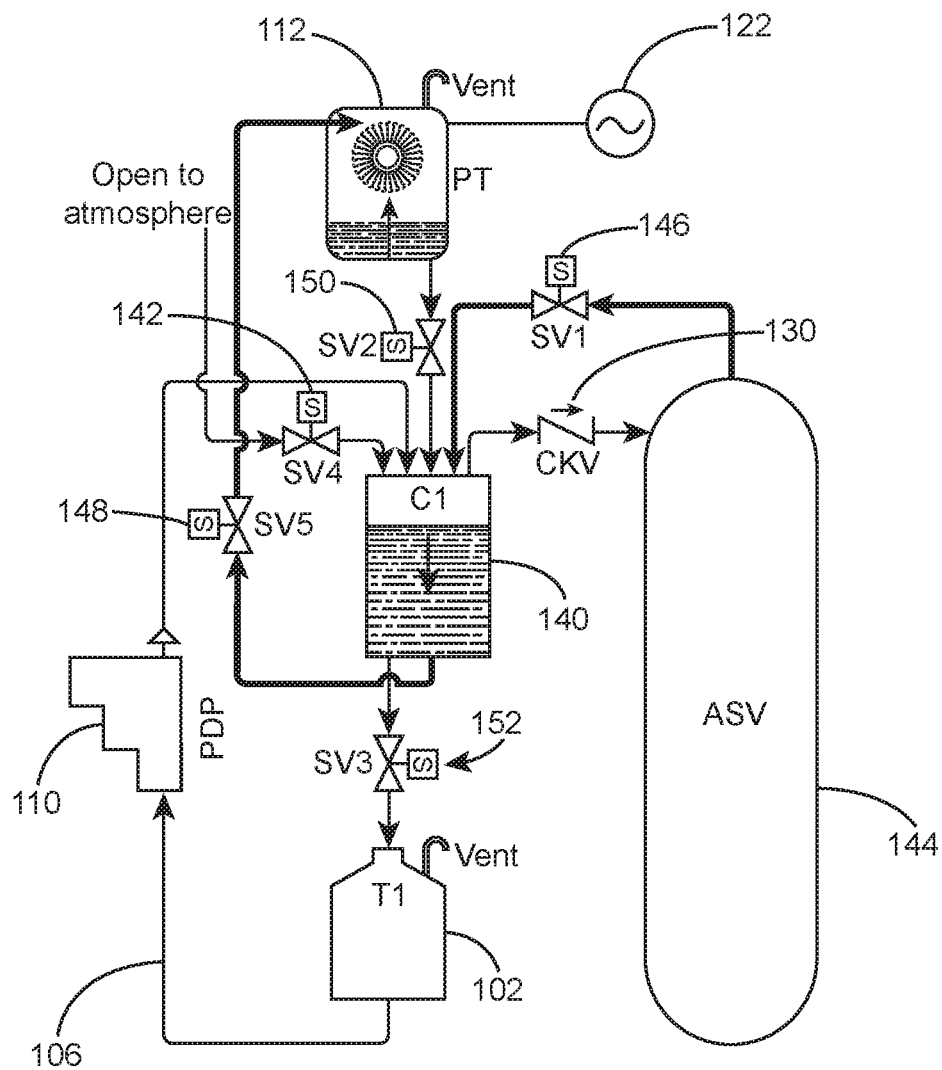
FIG. 24 is a schematic illustration of an open system operating in a first step of an energy extraction cycle.

FIG. 23 illustrates the second step in the energy storage cycle. Now, the valves 152 and 142 are opened. Working liquid (L) flows by gravity from cylinder 140 back into reservoir 102 and the cylinder 140 is replenished with ambient air. The first and second steps in the energy storage cycle are repeated until the desired pressure limit is reached in the pressure vessel 144. The energy is now stored until demand necessitates energy extraction at a second time that is later than the first time.

The energy extraction cycle takes place in a multi-step process at the second time. In the first step of the energy extraction cycle of FIG. 24, valve 146 is opened, allowing pressurized gas (G) under high pressure in pressure vessel 144 to apply pressure on the working liquid (L) stored in cylinder 140. Valve 148 is opened to direct working liquid (L) from the cylinder 140 into the hydropower turbine 112, which turns the electrical generator 122 via a drivetrain. Valve 146 is opened for just enough time so that the pressure in the pressure vessel 144 at the end of expansion is near atmospheric pressure.

Figure 25:
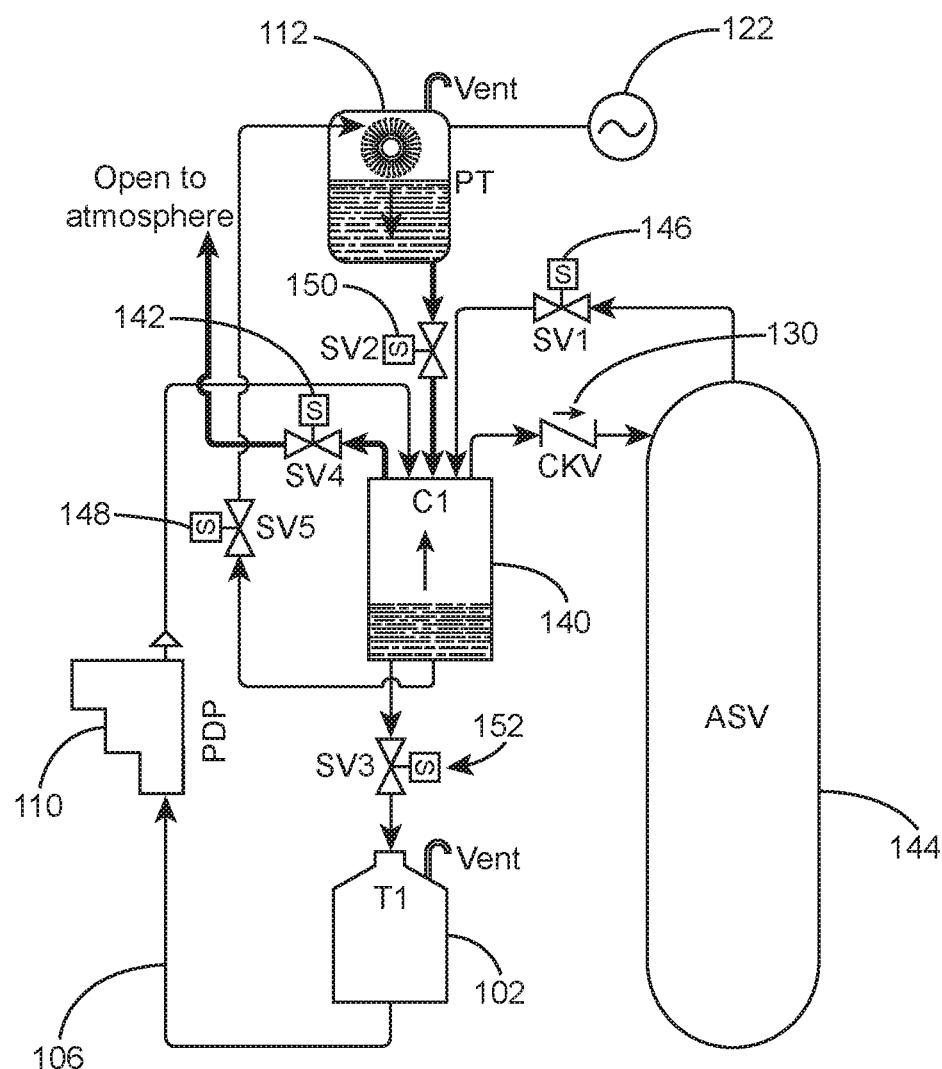
FIG. 25 is a schematic illustration of an open system operating in a second step of an energy storage cycle.

In the second step of the energy extraction cycle of FIG. 25, the cylinder 140 is recharged with working liquid (L). Once all of the working liquid (L) in cylinder 140 has been directed through the hydropower turbine 112, valve 150 is opened and working liquid (L) flows by gravity back into the cylinder 140. These two steps are repeated until all of the pressurized gas (G) energy stored in the pressure vessel 144 is extracted. Alternatively, if multiple systems added in series, the system can operate similar to the staged compressors/expanders so that between each stage the pressure rise/decrease for a certain amount. This will increase the system cost but help to improve the system efficiency and power delivery quality.

In order to approximately quantify the improvement in energy density between the closed system and the open system, a simplified thermodynamic model is presented below. The following assumptions are made: 1) compression is isothermal; 2) gas storage vessel is 1 m³; 3) gas (e.g., air) temperature is 25° C.; 4) ideal gas; 5) Initial pressure 70 bar; and 6) final pressure 130 bar.

A control volume is taken around the internal boundary of the pressure vessel, and the change in the internal energy is calculated for both the open and closed systems.

For the open system, $$PV = mRT$$

$$\Delta U = m_{final} C_v T_{final} - m_{initial} C_v T_{initial} \quad (24)$$

By substituting the values for pressure, volume, and temperature in the above equations, $$\Delta U_{proposed} = 15 \text{ MJ} \quad (25)$$

For the closed system, $$\Delta U = \text{Work of Compression} = mRT \ln \frac{V_{initial}}{V_{final}} \quad (26)$$

By substituting the values for pressure, volume, and temperature in the above equation, $$\Delta U_{original} = 4.3 \text{ MJ} \tag{27}$$

The open system stores more than three times the energy than the closed system stores in the same pressure vessel volume. In the open system, the total volume of the pressure vessel is available for energy storage. In the closed system, only about half the volume of the pressure vessel is available for energy storage as the working liquid (L) is stored in the vessels to compress the gas (G).

Moreover, from reliability and consistency perspectives, the open system is less sensitive to a potential leak in the system. In the closed system, even the smallest of leaks could degrade the performance over time because there is initially a fixed mass of pressurized gas (G) charged into the system. However, in the open system, the system is recharged with the fresh ambient air and the effect of a leak during one charging and discharging cycle should be negligible.

The pressure swing in the open system is significantly more frequent than in the closed system. In the closed system extraction cycle, gas pressure smoothly decreases (i.e. 130 to 70 bar in the existing prototype) over a period of 1 hour while, in the open system extraction cycle, the pressure goes through the same pressure swing at every cycle over a period of minutes. In order to make output power steady, several open systems could operate in parallel with staggered extraction cycles or an advanced power conditioning system could be used to make the output power more constant. Alternatively, if multiple systems added in series, the system can operate similar to the staged compressors/expanders so that between each stage the pressure rise/decrease for a certain amount. This will increase the system cost but help to improve the system efficiency and power delivery quality.

Condensable Gases.

A condensable gas (G) may be used instead of air, or any non-condensable gas in general, in order to increase the energy density of the closed systems. The pressure vessels may be initially charged with a condensable gas to near its condensing pressure. As a working liquid (L) (e.g., water) is pumped into the vessels, the pressurized gas (G) atop the working liquid (L) will start to change phase, from gaseous to liquid. Due to the big difference in density between the gaseous and liquid phases, a larger volume is available for the working liquid (L) than in the case of non-condensable gas. The amount of energy that can be stored in the vessels increases by a factor equal to the ratio of the extra volume gain to the final volume of water in the vessels when non-condensable gas is used. For example, for a condensable gas with liquid to gaseous density ratio of 10, the energy density increases by a factor of 1.8 compared to the case of non-condensable gas. Considering the uniformity of the head during discharge in the system this number can be even significantly larger as the head does not fall during discharge hence generator and turbine efficiencies will always be around the design point.

Figure 26:
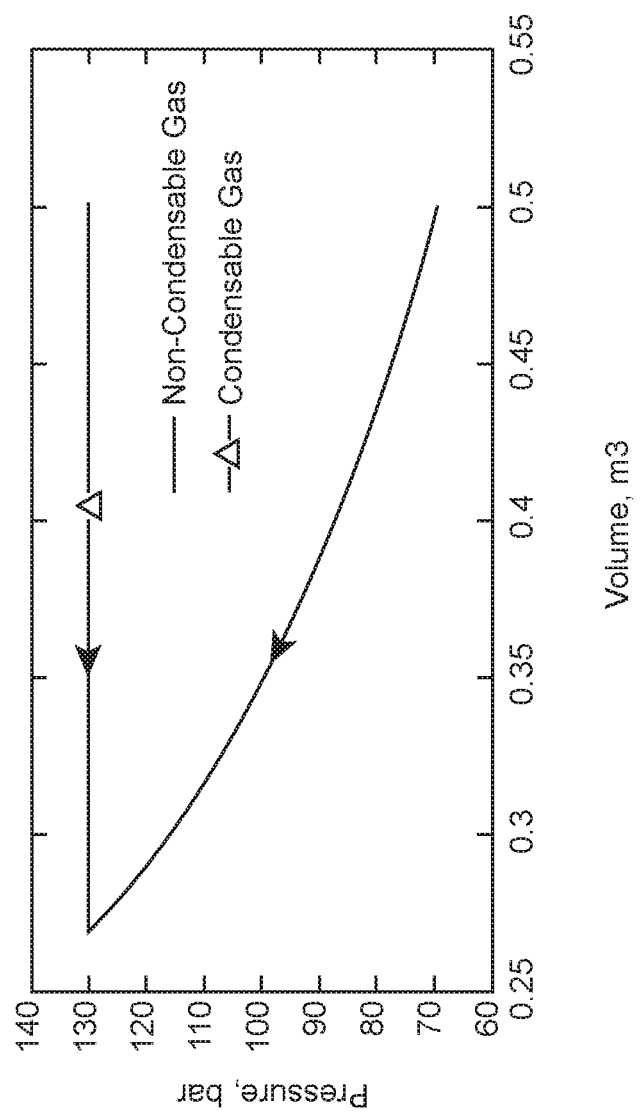
FIG. 26 is a p-v diagram for compression (energy storage cycle) of non-condensable and condensable gases.

Furthermore, compression takes place under constant pressure during phase change, so the pump runs against a constant pressure head. The benefit of the constant pressure compression is twofold; the amount of stored energy increases since the area under the P-v curve is larger as shown in FIG. 26; and the pump operates at its full load point throughout the compression cycle, which eliminates the part-load losses that result from the low efficiency of part-load pump operation.

During the energy extraction cycle, the expansion of the gas (G) inside the vessels also takes place at a constant pressure, and hence, the flow rate of the working liquid (L) leaving the vessels and entering the turbine is constant. Therefore, the turbine can operate at its point of maximum efficiency throughout the entire energy extraction cycle. This eliminates the inevitable losses of the part load operation resulting from diminishing pressure inside the vessels when using a non-condensable gas (G). When we combine these effects, the energy density of the system will be at least tripled if condensable gas (G) is used instead of air in the system.

An expandable bladder 120 may be used to contain the condensable gas (G) inside the high-pressure vessel to separate and/or insulate the condensable gas (G) from the working liquid (L) inside the vessel. By separating the condensable gas (G) from the working liquid (L), we avoid any potential miscibility in, or chemical reaction with, the working liquid (L).

A preliminary investigation was performed on 220 pairs of binary gas mixtures shown in the Table of FIG. 27. For each pair of binary gases, the saturation pressure, saturated liquid density and saturated vapor density were calculated at nine temperature levels (from 10° C. to 90° C.) and at hundred levels of concentration (from 1 to 100%) Several pairs show promising potentials for this application. The top ten performing binary gas mixtures are listed in the Table of FIG. 28. Other gases such as pure CO2, pure Ammonia and hydrocarbons could also be used.

Economic Benefits.

The above-described ground-level energy storage and extraction systems (GLIDES) have the potential to be a transformative technology for temporary or long-term energy storage. The systems function at ground level and may be easily retrofitted into existing structures. Additional efficiency gains are realizable by utilizing heat transfer enhancement strategies such as working liquid spraying to achieve direct contact heat exchange between gas and working liquid, and leveraging any available waste heat to counter the cooling of expansion and even provide a thermal boost. Waste heat could be harnessed via a solar-thermal hot water receiver, phase change materials, geothermal heat, combustion heat, stack of power plants or furnaces, CHP systems, cooling towers or condenser of air conditioning condensers for example. Feasibility simulations to study the potential impact of the aforementioned measures suggest that RTE could be boosted from 66% in the closed configuration to 74%. If higher efficiency auxiliary components (pump, motor, turbine, and generator) are used, the systems could reach even higher RTEs. RTE improves by keeping the gas expansion and compression processes as close to isothermal as possible.

A major benefit of these systems is that they are modular and can be scaled from a few kWs, meeting the demands of a single-family home or cabin, to power plant scales of several hundred MWs, simply by scaling up or duplicating the individual components. These systems are a key technology enabler in firming up market penetration of renewable energy technologies, as well as providing opportunities to engage in energy arbitrage.

While this disclosure describes and enables several examples of ground-level energy storage and extraction systems, other examples and applications are also contemplated. Accordingly, the invention is intended to embrace those alternatives, modifications, equivalents, and variations as fall within the broad scope of the appended claims. The systems disclosed and claimed herein may be available for licensing in specific fields of use by the assignee of record.

What is claimed is:

1. A ground-level energy storage and extraction system comprising:
    a reservoir for storing a working liquid;
    a common pressure vessel for storing both a volume of a gas and a volume of the working liquid in a common location;
    a pump fluidly coupled between said reservoir and said common pressure vessel;
    a check valve coupled between said pump and said common pressure vessel;
    a hydropower turbine fluidly coupled to a bottom portion of said common pressure vessel through a control valve;
    an electrical generator mechanically coupled to said hydropower turbine; and
    wherein, when the system is operating in an energy storage cycle at a first time, said pump is energized by a power source and temporarily interrupted to maintain a measured temperature of the volume of gas to within a predetermined temperature range as a portion of the working liquid is transferred from said reservoir to said common pressure vessel by said pump such that a volume of gas in said common pressure vessel is compressed inside said common pressure vessel and,
    wherein, when the system is operating in an energy extraction cycle at a second time that is later than the first time, the working liquid is directed to drive said hydropower turbine under pressure from the volume of gas which, in turn, drives said electrical generator to produce electricity to power a load at the second time.

2. The ground-level energy storage and extraction system of claim 1 wherein said pump is a positive displacement pump.

3. The ground-level energy storage and extraction system of claim 1 wherein said hydropower turbine is fluidly coupled between said common pressure vessel and said reservoir.

4. The ground-level energy storage and extraction system of claim 1 wherein the power source that energizes said pump is a renewable power source.

5. The ground-level energy storage and extraction system of claim 1 and further comprising means for influencing the temperature and pressure of the gas in said common pressure vessel.

6. The ground-level energy storage and extraction system of claim 5 wherein the temperature and pressure influencing means includes an internal or an external recirculating pump fluidly coupled in a recirculation loop between a bottom portion of said common pressure vessel and a top portion of said common pressure vessel for recirculating the working liquid from the bottom portion of said common pressure vessel to the top portion of said common pressure vessel as a spray.

7. The ground-level energy storage and extraction system of claim 6 and further comprising a heat exchanger in thermal communication with the circulating working liquid.

8. The ground-level energy storage and extraction system of claim 7 wherein said heat exchanger is coupled to a heat exchanger of a heat resource.

9. The ground-level energy storage and extraction system of claim 7 wherein said heat exchanger is coupled to a volume of phase change material.

10. The ground-level energy storage and extraction system of claim 5 wherein the temperature and pressure influencing means includes an insulating material disposed between the working liquid and the pressurized gas.

11. The ground-level energy storage and extraction system of claim 1 wherein the working liquid is water.

12. The ground-level energy storage and extraction system of claim 1 wherein the gas is air.

13. The ground-level energy storage and extraction system of claim 1 wherein the gas is a binary condensable gas.

14. The ground-level energy storage and extraction system of claim 1 wherein the gas is chosen from the group consisting of Pure $CO_2$, Pure Ammonia, hydrocarbons, 65% Propane & 35% Nitrogen, 7% n-Pentane & 93% Carbon-Dioxide, 98% CarbonDioxide & 2% n-Heptane, 40% CarbonDioxide & 60% Propane, 82% CarbonDioxide & 18% IsoButane, 80% CarbonDioxide & 20% Isopentane, 95% CarbonDioxide & 5% Isopentane, 60% IsoButane & 40% Nitrogen, 21% n-Butane & 79% CarbonDioxide, and 74% n-Pentane & 26% Nitrogen.

15. The ground-level energy storage and extraction system of claim 1 wherein the gas is stored within a flexible bladder when inside said common pressure vessel.

16. The ground-level energy storage and extraction system of claim 1 wherein the energy storage cycle occurs in a closed system.

17. The ground-level energy storage and extraction system of claim 1 wherein the energy extraction cycle occurs in a closed system.

18. The ground-level energy storage and extraction system of claim 1 wherein its round-trip efficiency is greater than 65 percent.

* * * * *